Dec. 29, 1964    C. W. DAVID    3,163,572
SEMI-AUTOMATIC ETCHING MACHINE
Filed April 19, 1961    19 Sheets-Sheet 2

INVENTOR.
CHARLES W. DAVID
BY
James H. Bower
ATTORNEY

Dec. 29, 1964

C. W. DAVID 3,163,572

SEMI-AUTOMATIC ETCHING MACHINE

Filed April 19, 1961

INVENTOR.
CHARLES W. DAVID
BY
James H. Bower
ATTORNEY

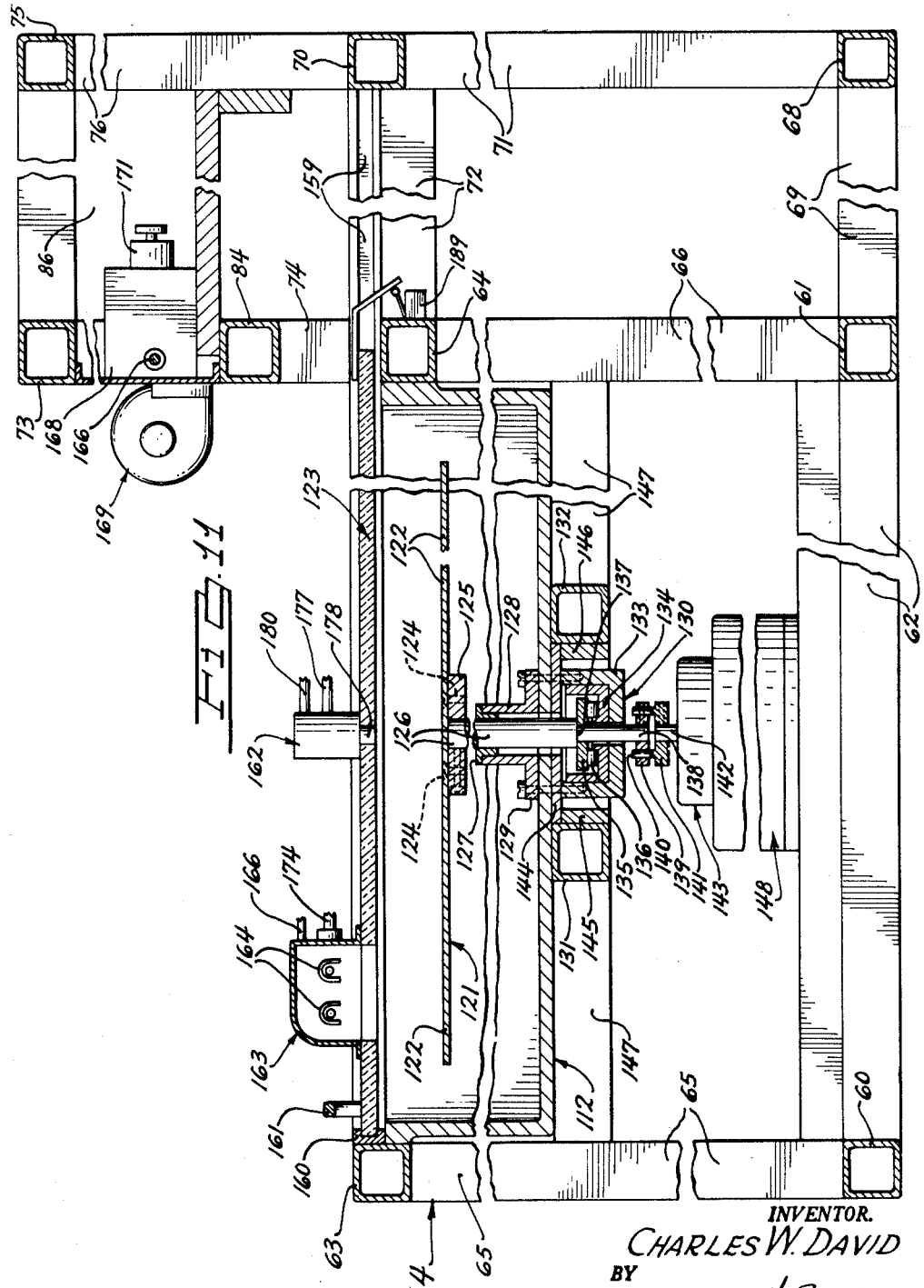

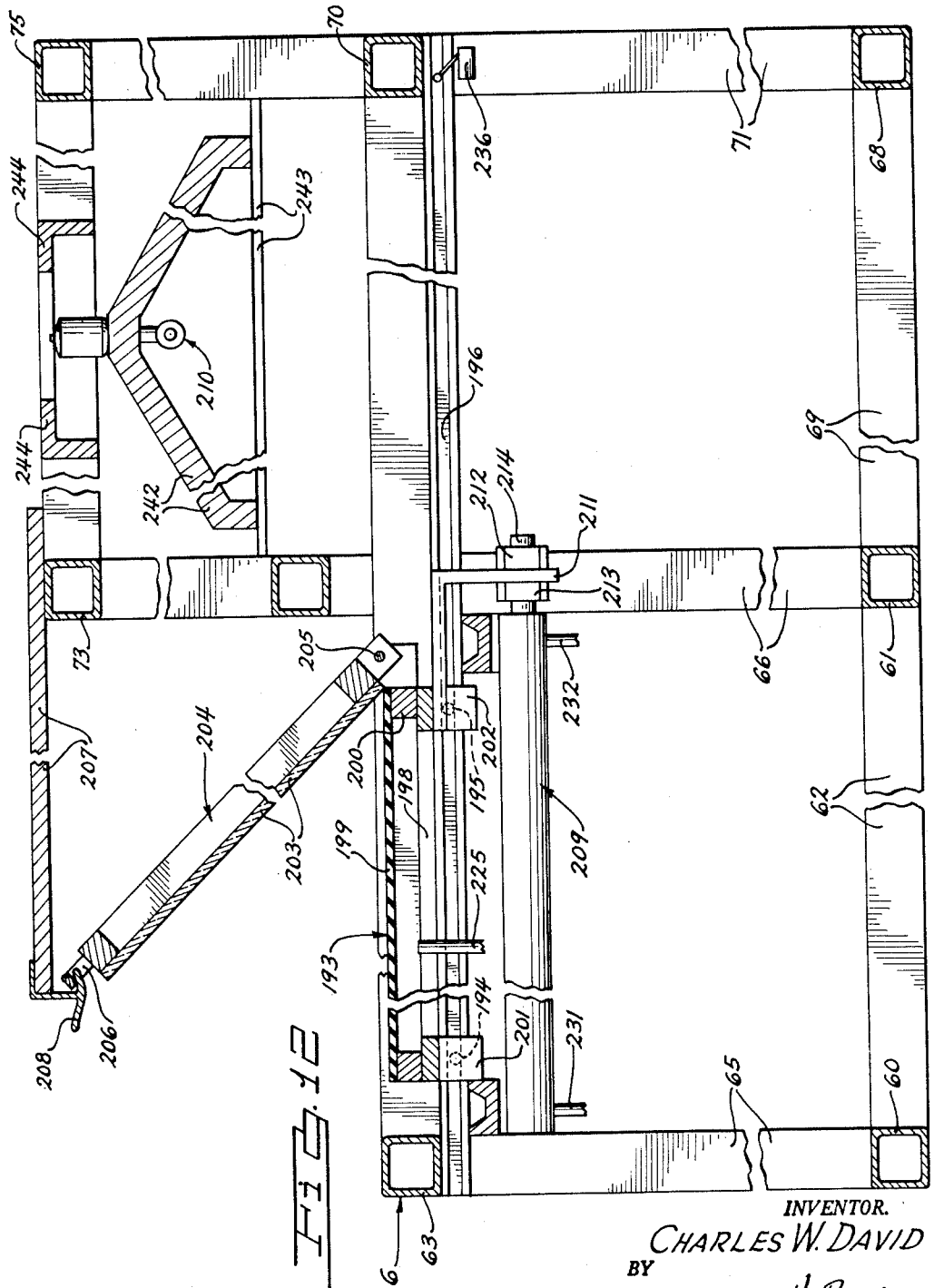

Dec. 29, 1964  C. W. DAVID  3,163,572
SEMI-AUTOMATIC ETCHING MACHINE
Filed April 19, 1961  19 Sheets-Sheet 13
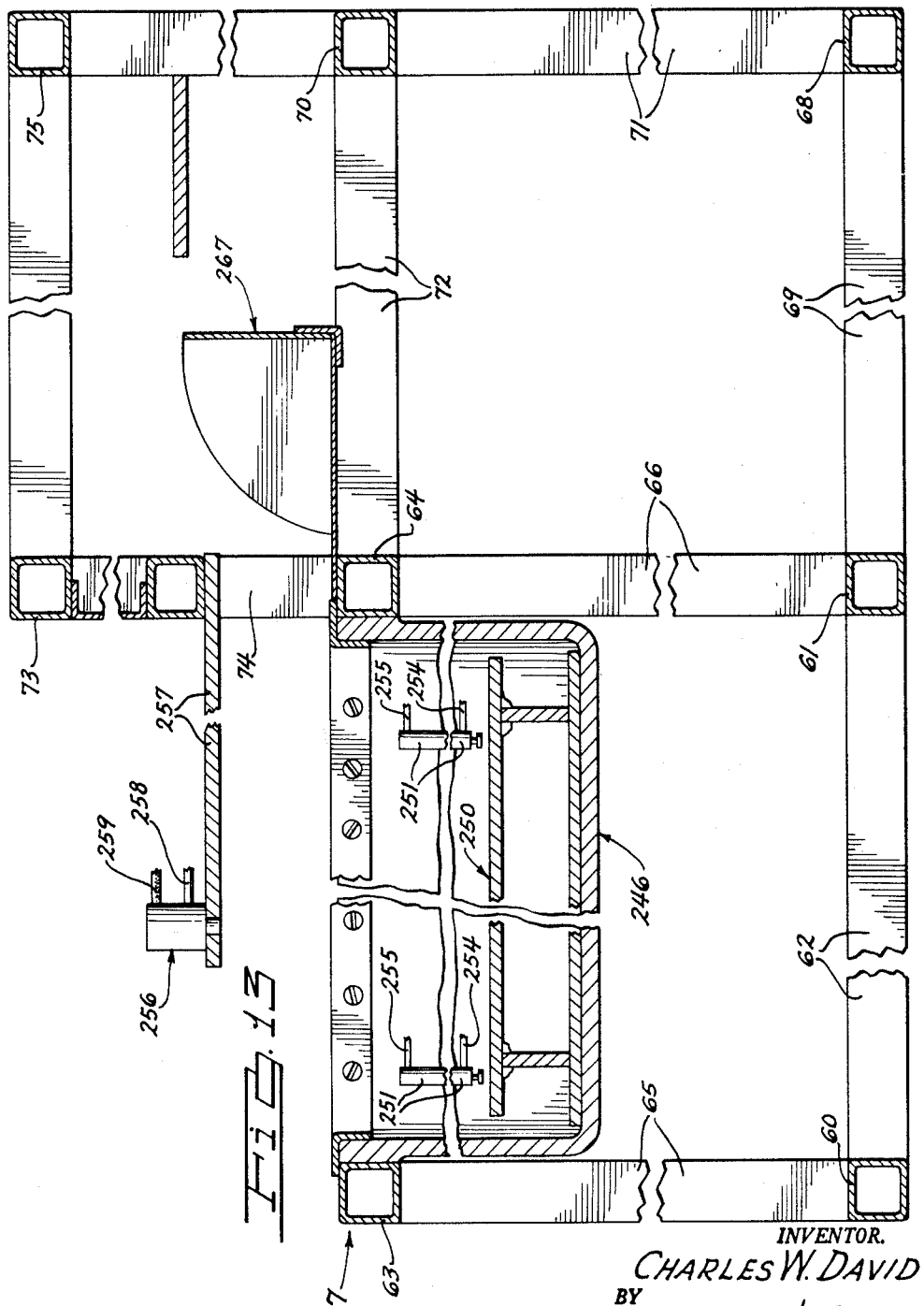
INVENTOR.
CHARLES W. DAVID
BY
James H. Bower
ATTORNEY Dec. 29, 1964  C. W. DAVID  3,163,572
SEMI-AUTOMATIC ETCHING MACHINE
Filed April 19, 1961  19 Sheets-Sheet 14
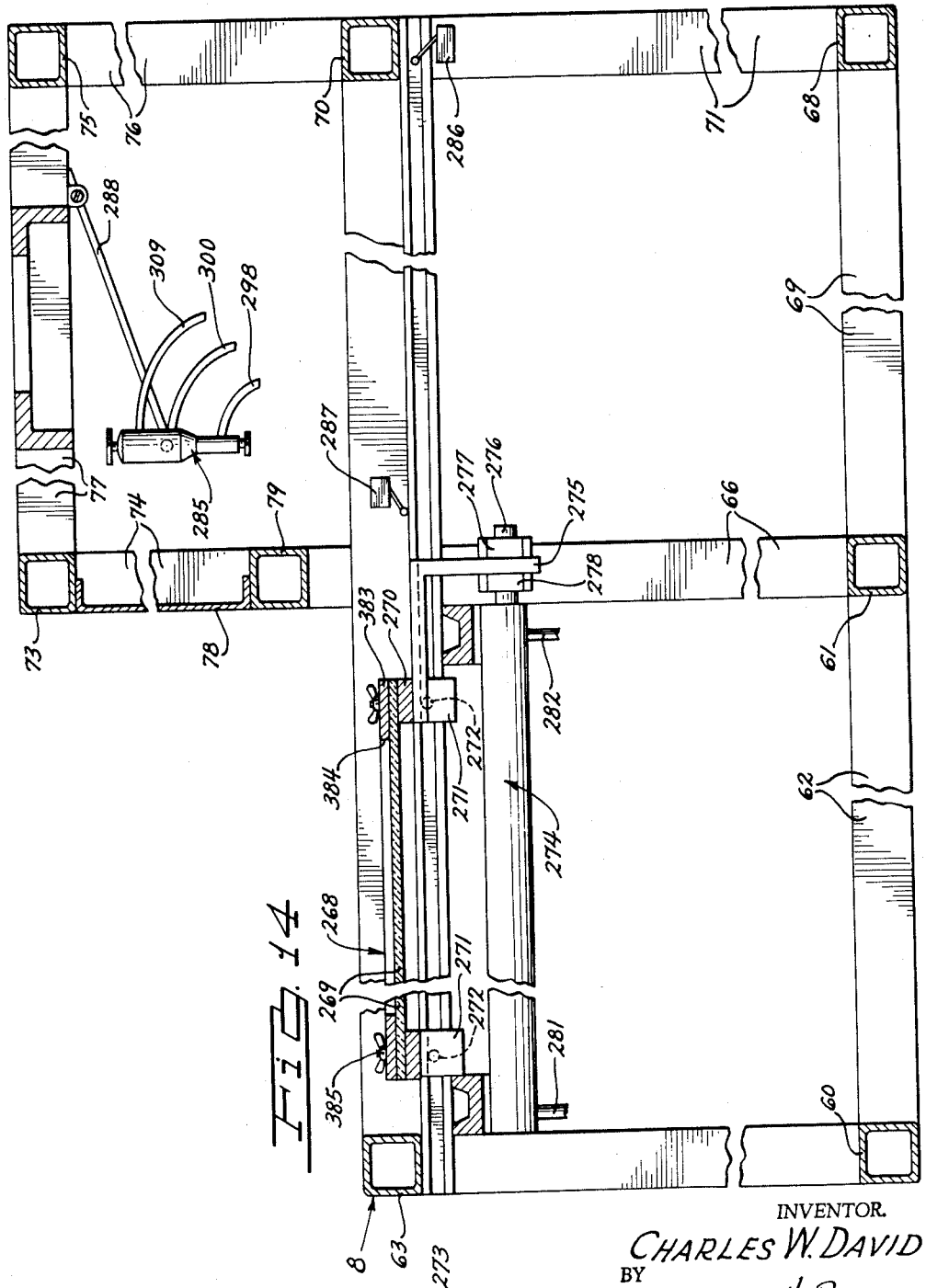
INVENTOR.
CHARLES W. DAVID
BY
James H. Bower
ATTORNEY

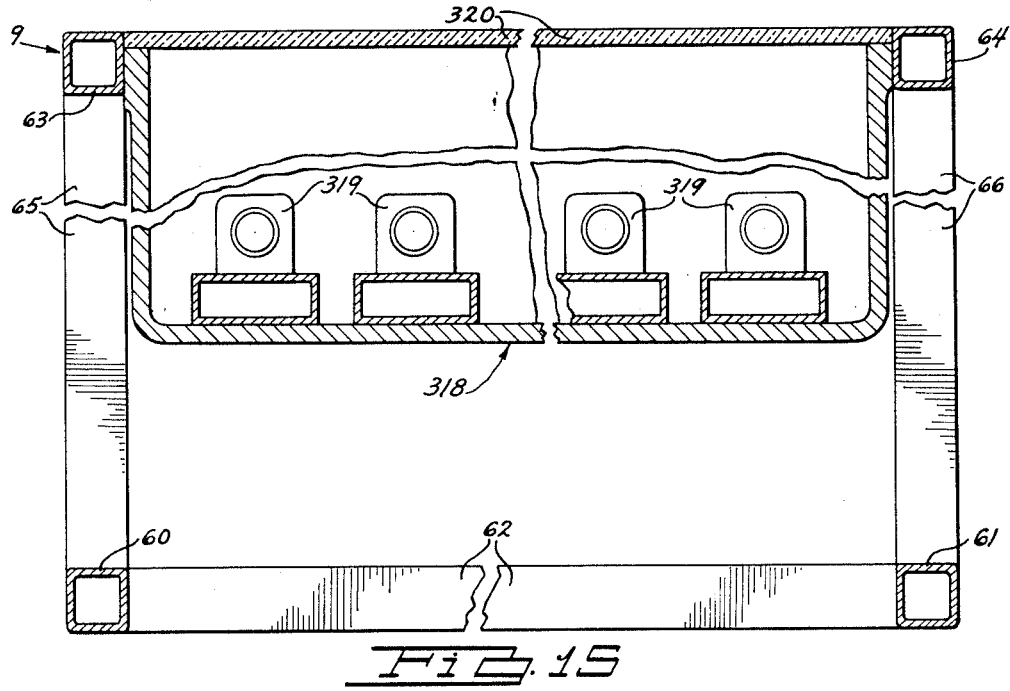
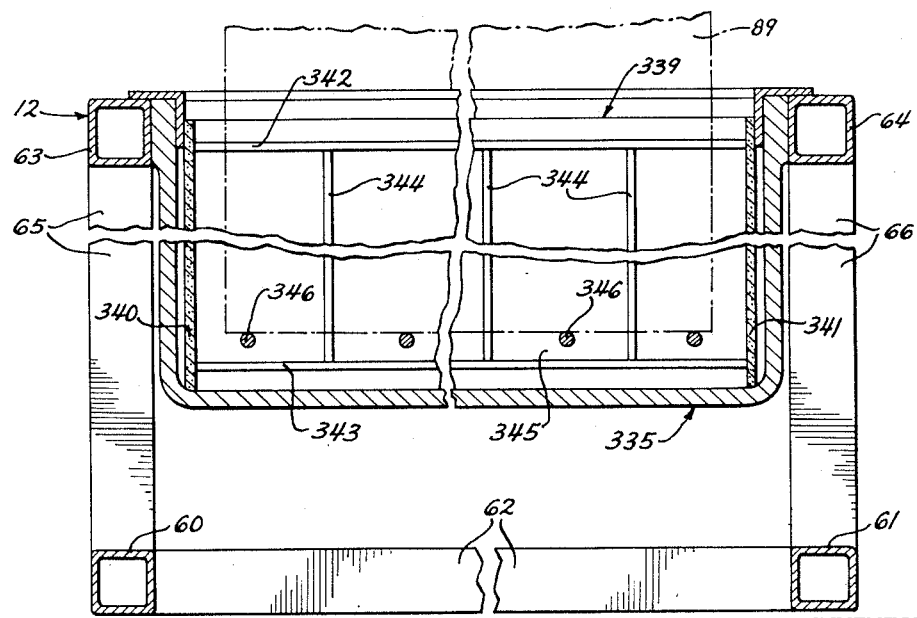

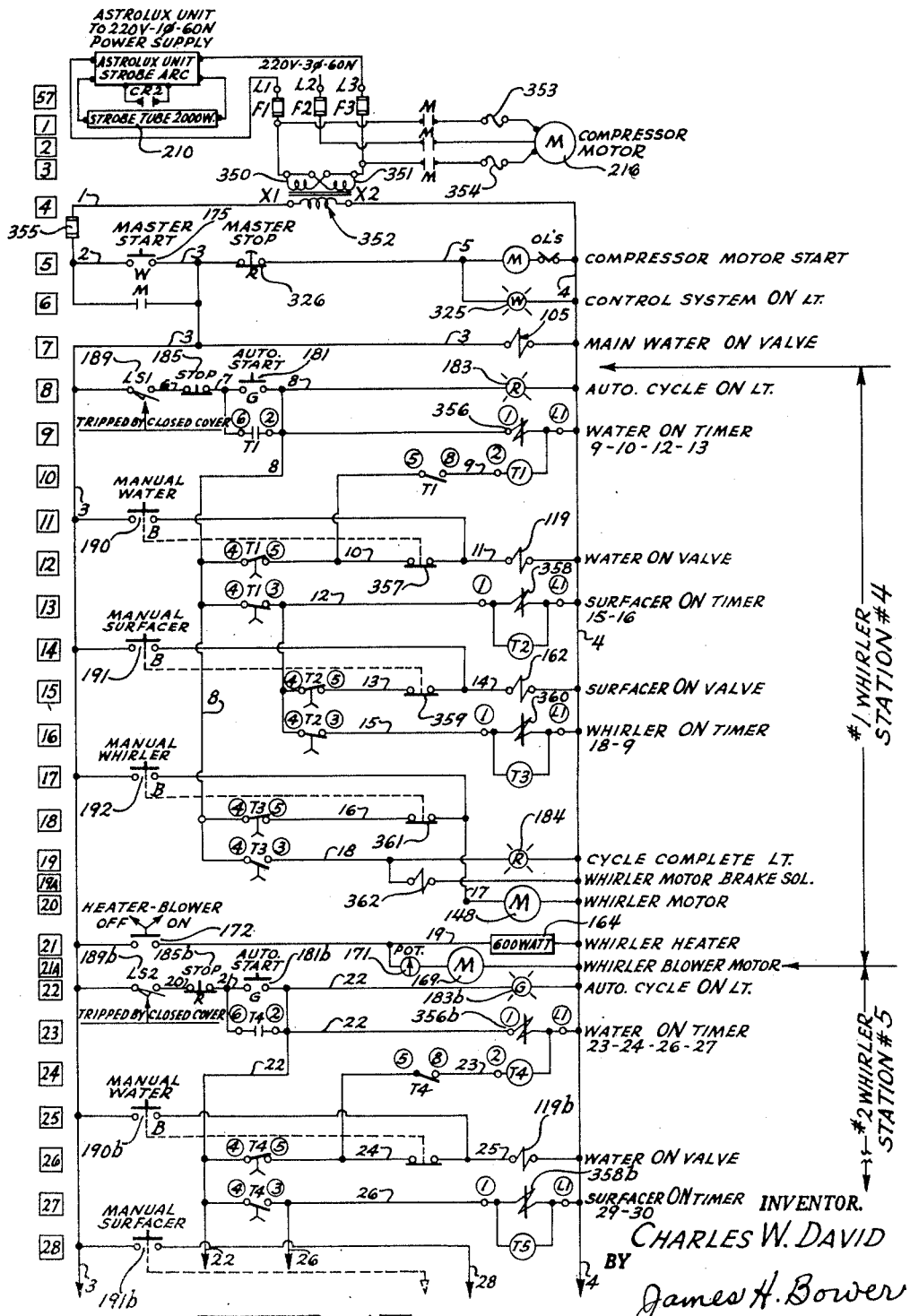

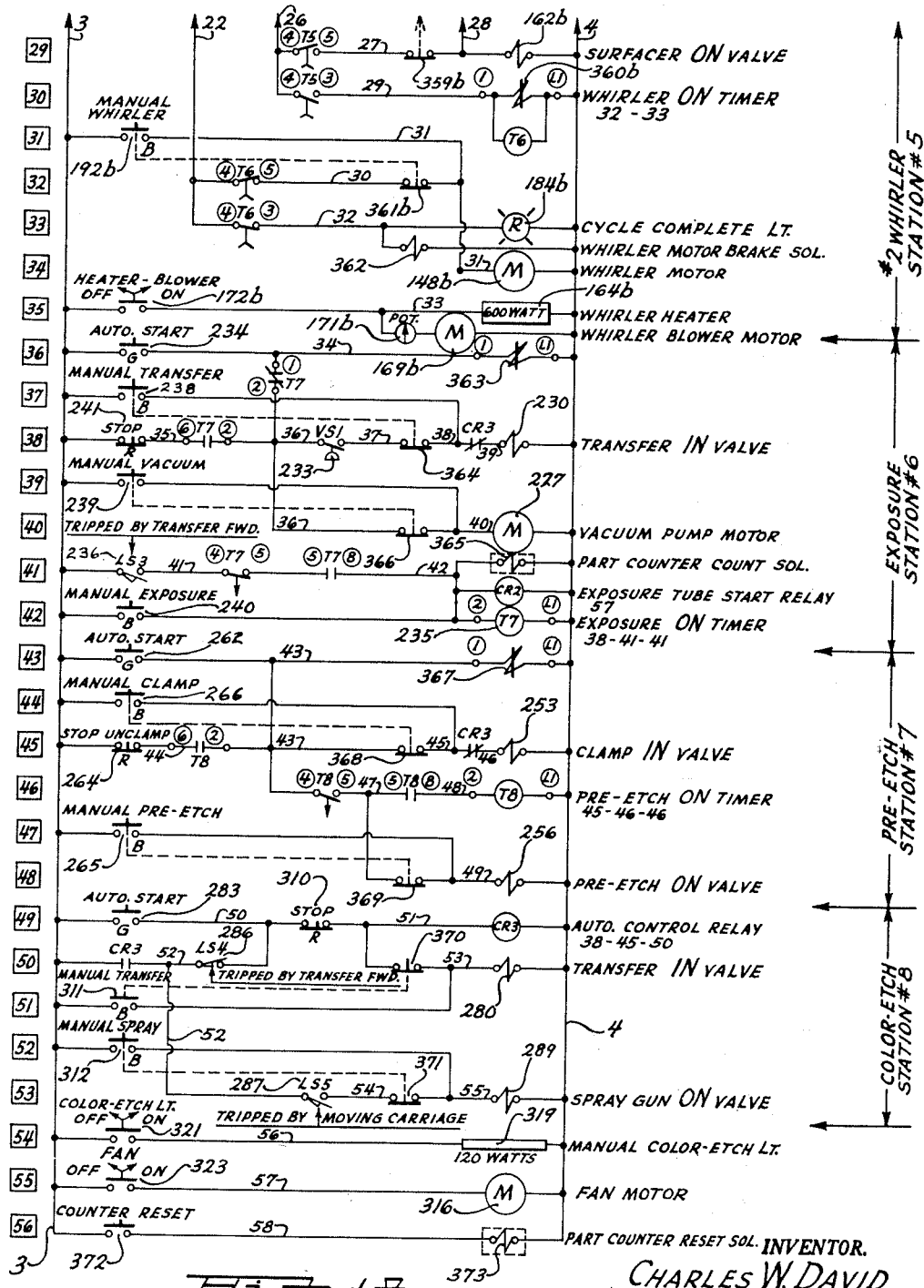

Dec. 29, 1964 C. W. DAVID 3,163,572
SEMI-AUTOMATIC ETCHING MACHINE
Filed April 19, 1961 19 Sheets-Sheet 18
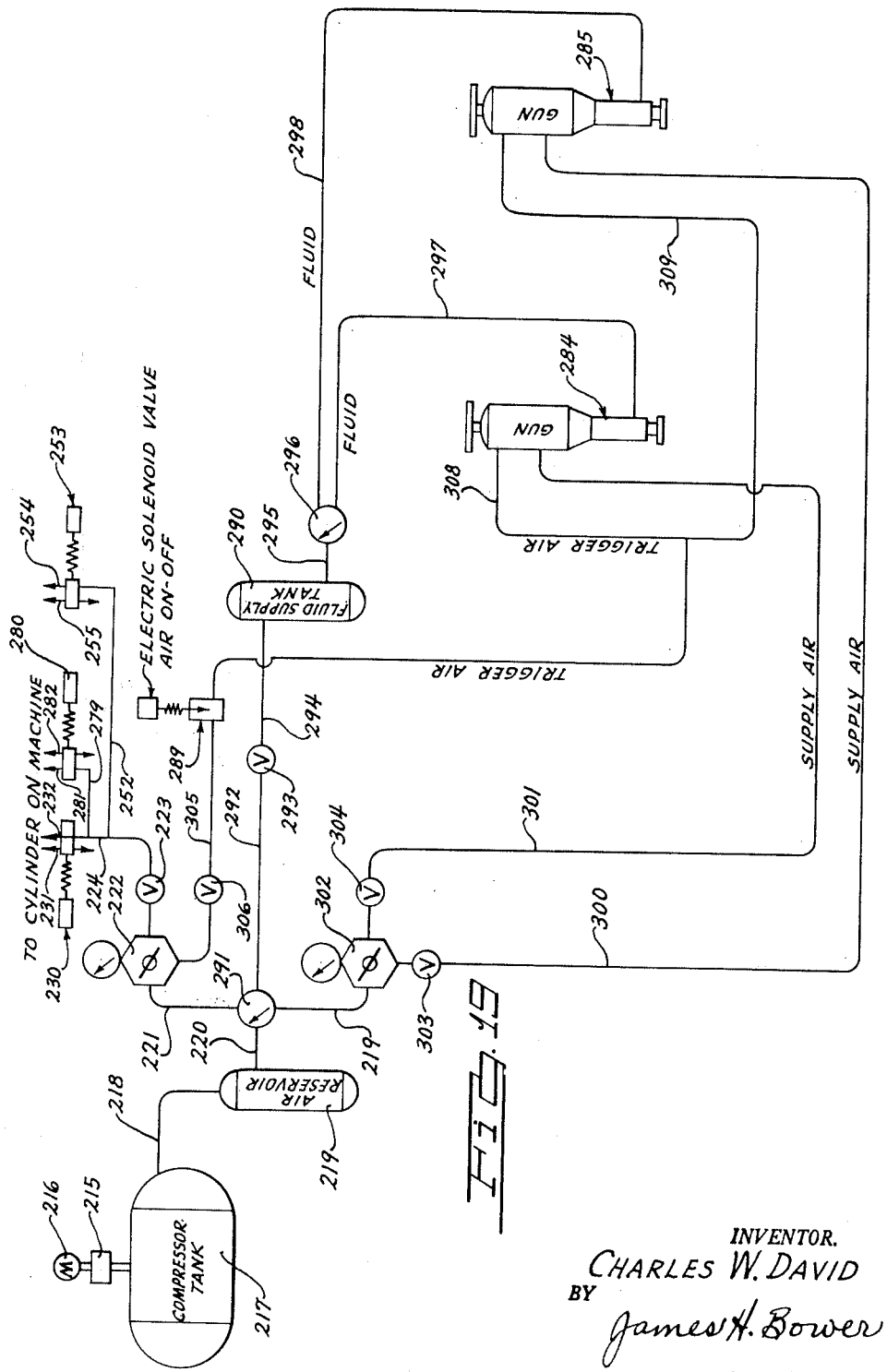
INVENTOR.
CHARLES W. DAVID
BY
James H. Bower
ATTORNEY Dec. 29, 1964    C. W. DAVID    3,163,572
SEMI-AUTOMATIC ETCHING MACHINE
Filed April 19, 1961    19 Sheets-Sheet 19
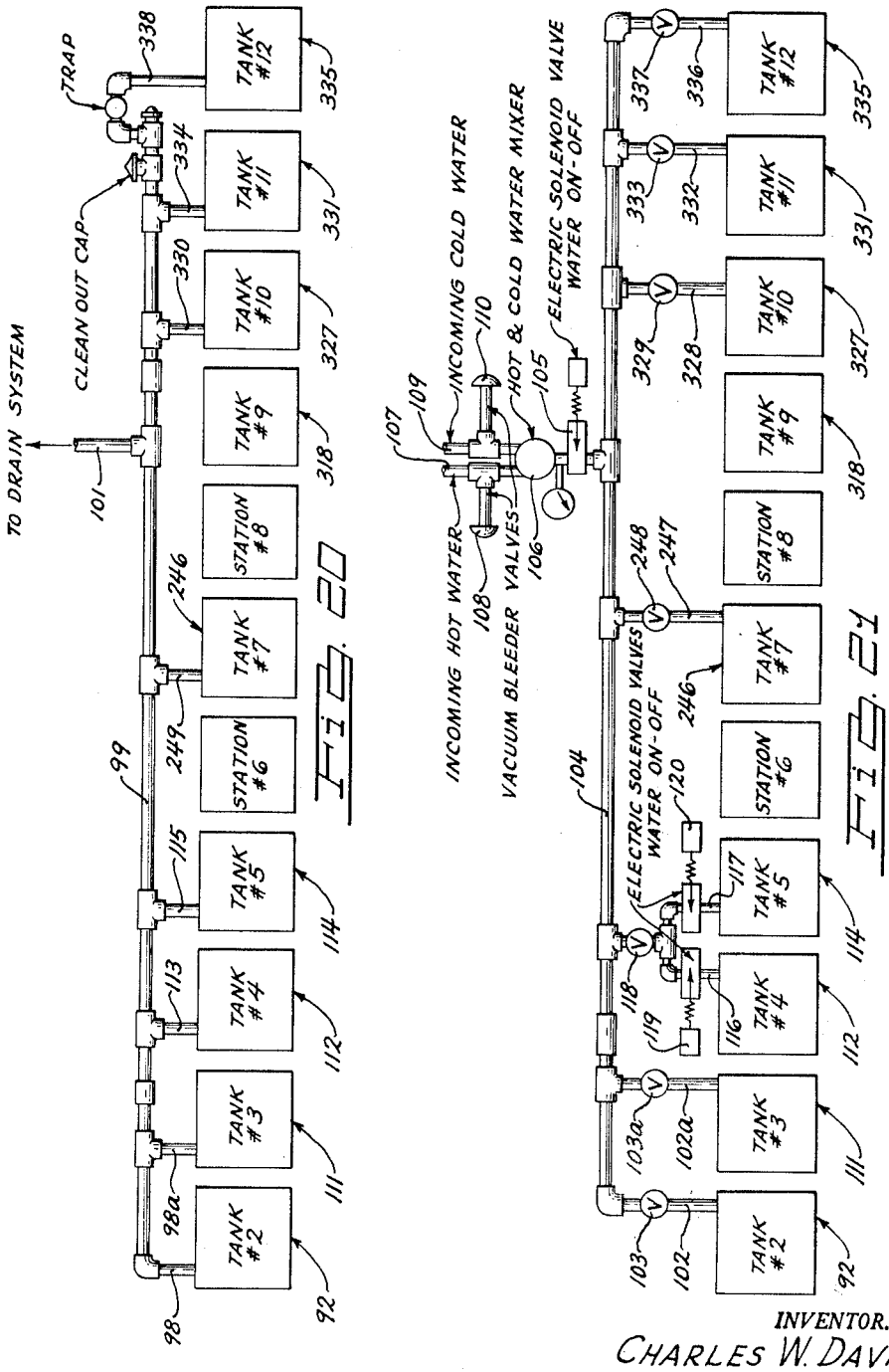

United States Patent Office 3,163,572
Patented Dec. 29, 1964

3,163,572
SEMI-AUTOMATIC ETCHING MACHINE
Charles W. David, Rush, N.Y., assignor to Optical Gaging Products, Inc., Rochester, N.Y., a corporation of New York
Filed Apr. 19, 1961, Ser. No. 104,024
13 Claims. (Cl. 156—345)

This invention relates generally to the plastic etching art, and, more particularly, to a novel semi-automatic machine for carrying out a color etching process on articles made from plastic materials or the like.

At the present time it is common practice in many industries and businesses to use comparator charts, electrical circuits embedded in plastic materials, specification sheets wherein the specifications are color etched in plastic sheets, and other like articles having etched written material, configurations or the like. Heretofore, these etched articles have been made by various processes which are manually performed, costly, and time consuming. Accordingly, it is an important object of the present invention to provide a semi-automatic machine for carrying out a color etch process for etching a design, written material, or the like in the surface of a sheet of plastic or dielectric material, and wherein the resulting etch marks or lines are fashioned to a pre-determined width and depth and are provided with any desired deposit material, and which deposit material may have any desired color and electrical characteristics.

It is another object of the present invention to provide a semi-automatic machine for color etching designs and written material in the surface of a plastic or dielectric material with a degree of accuracy heretofore not possible with the prior art devices and manual means for carrying out color etching processes.

It is a further object of the present invention to provide a novel and improved semi-automatic color etch process machine which is provided with a plurality of work stations which are constructed and arranged so that an operator of the machine can quickly and accurately process a plurality of plastic sheets or articles through the machine, from the first or storage station through the various processing steps and to the final or wrapping station.

It is still another object of the present invention to provide a semi-automatic color etch process machine which is constructed to provide a plurality of work stations in a novel and compact arrangement, whereby a plurality of plastic sheets or articles may be simultaneously processed through the machine in a fast and efficient manner and yet produce accurately etched designs or the like on the plastic sheets or articles.

It is still another object of the present invention to provide a semi-automatic machine which is capable of color etching a large quantity of plastic articles in a minimum of time and with a high degree of accuracy and which machine is compact, light in weight and simple in over-all construction, economical of manufacture and in which the various work stations are physically interconnected, and electrically interconnected by means of a novel electrical control system.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

In the drawings:

FIG. 11 is an enlarged, broken, elevational sectional view of the structure of machine Station No. 4, with parts removed, and taken along the line 11—11 of FIG. 4, and looking in the direction of the arrows;

FIG. 12 is an enlarged, broken, elevational sectional view of the structure of machine Station No. 6, with parts removed, taken along the line 12—12 of FIG. 3, and looking in the direction of the arrows;

FIG. 13 is an enlarged, broken, elevational sectional view of the structure of machine Station No. 7, with parts removed, taken along the line 13—13 of FIG. 3, and looking in the direction of the arrows;

FIG. 14 is an enlarged, broken, elevational sectional view of the structure of machine Station No. 8, with parts removed, taken along the line 14—14 of FIG. 2, and looking in the direction of the arrows;

FIG. 15 is an enlarged, broken, elevational sectional view of the structure of machine Station No. 9, with parts removed, taken along the line 15—15 of FIG. 1, and looking in the direction of the arrows;

FIG. 16 is an enlarged, broken, elevational sectional view of the structure of machine Station No. 12 taken along the line 16—16 of FIG. 1, and looking in the direction of the arrows;

FIG. 17 shows a first portion of the electronic control circuit for the machine illustrated in FIG. 1;

FIG. 18 shows the second portion of the electronic control circuit for the machine illustrated in FIG. 1, and this second circuit is a continuation of the first circuit portion shown in FIG. 17;

FIG. 19 shows an illustrative pneumatic circuit employed in the machine illustrated in FIG. 1;

FIG. 20 is a schematic diagram of the fluid drain system employed in the machine illustrated in FIG. 1;

FIG. 21 is a schematic diagram of the water intake system employed in the machine illustrated in FIG. 1;

Figure 1:
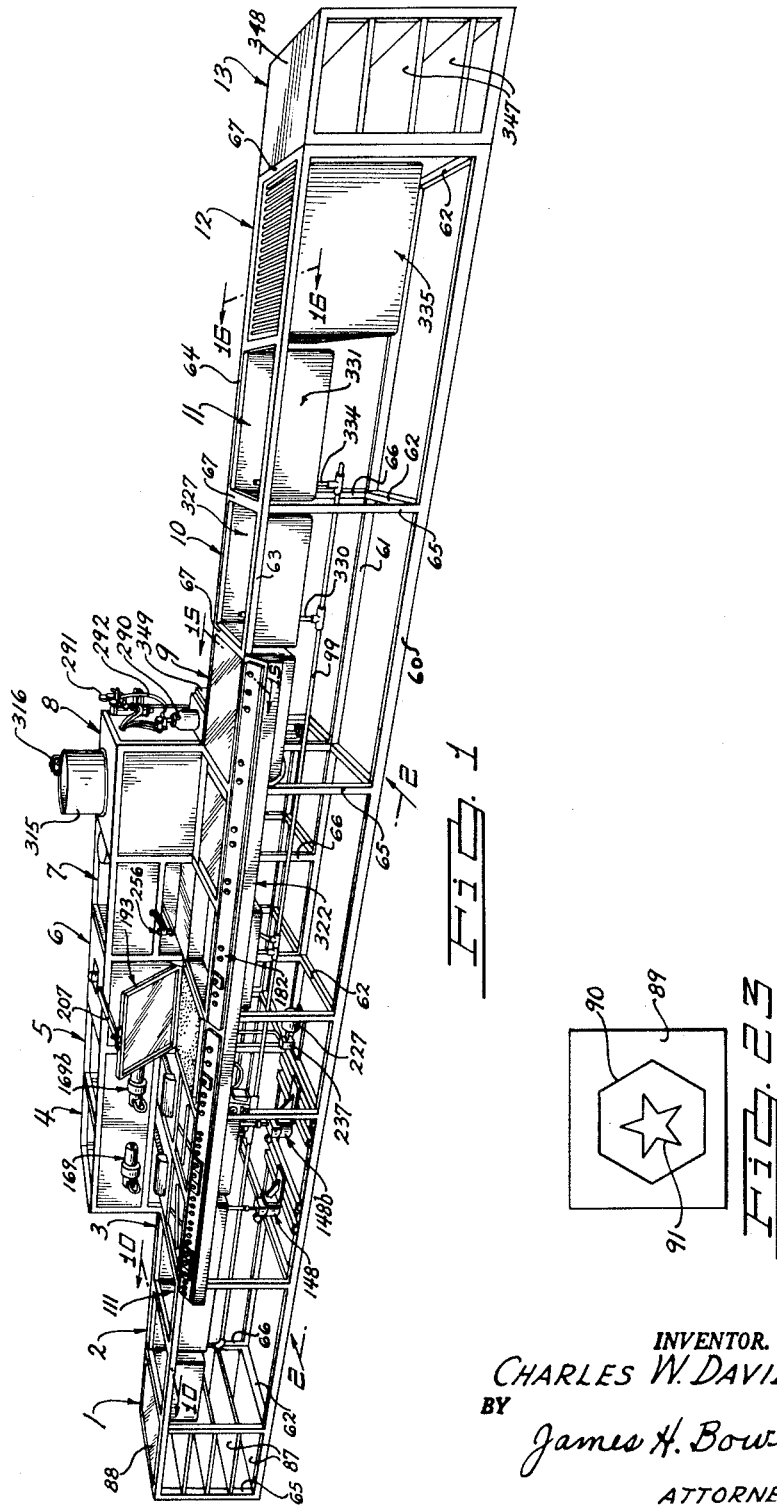
FIG. 1 is a front perspective view of a semi-automatic etching machine made in accordance with the principles of the present invention.
Figure 2:
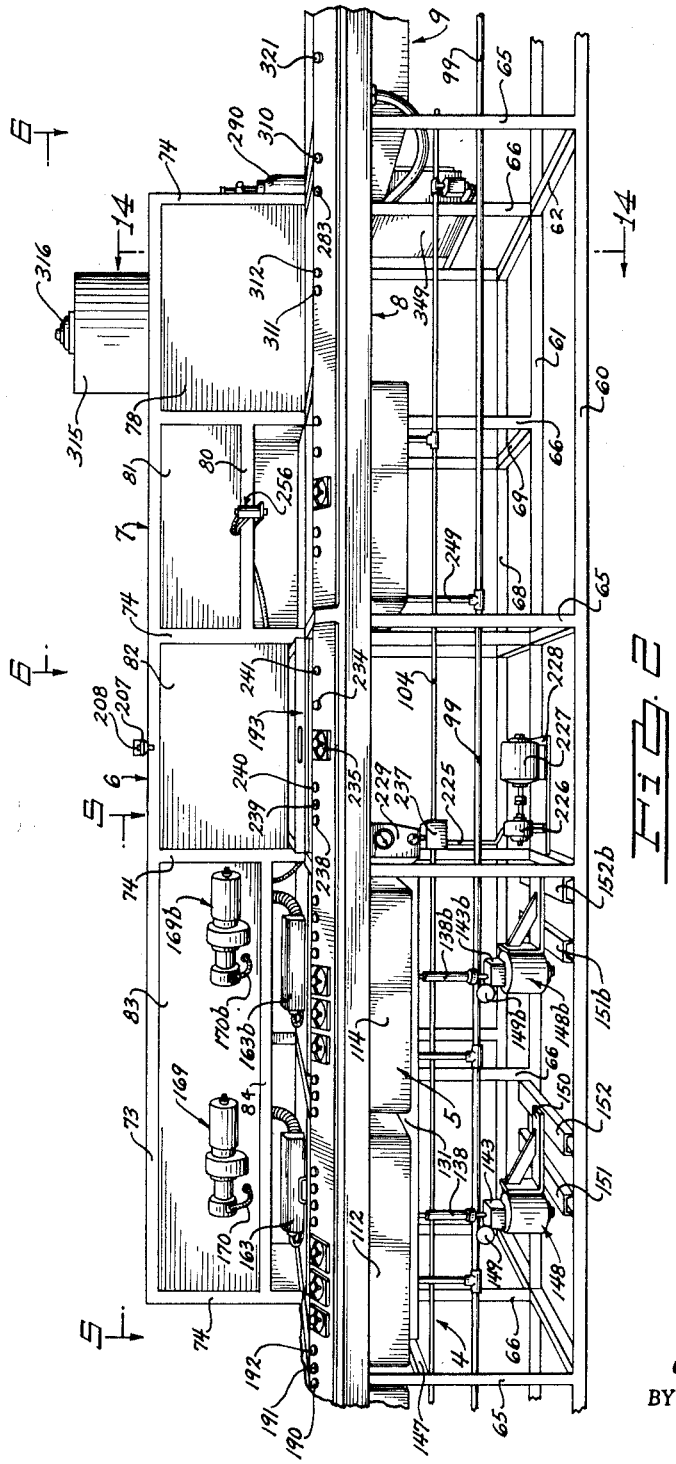
FIG. 2 is an enlarged, fragmentary, front elevational view of the structure illustrated in FIG. 1, taken along the line 2—2 thereof and looking in the direction of the arrows.

Referring now to the drawings wherein is shown an illustrative embodiment of the invention, and more particularly to FIGS. 1 and 2, the various work stations of the machine have been designated generally by the numerals 1 through 13. The machine illustrated in the drawings comprises an elongated supporting frame which is constructed from seamless tubing which is approximately two inches square and wherein all of the frame members are fixedly secured together as by welding. The main frame structure includes Stations 1 through 12 and the packing or wrapping Station 13 is illustrated as being separately constructed.

Figure 3:
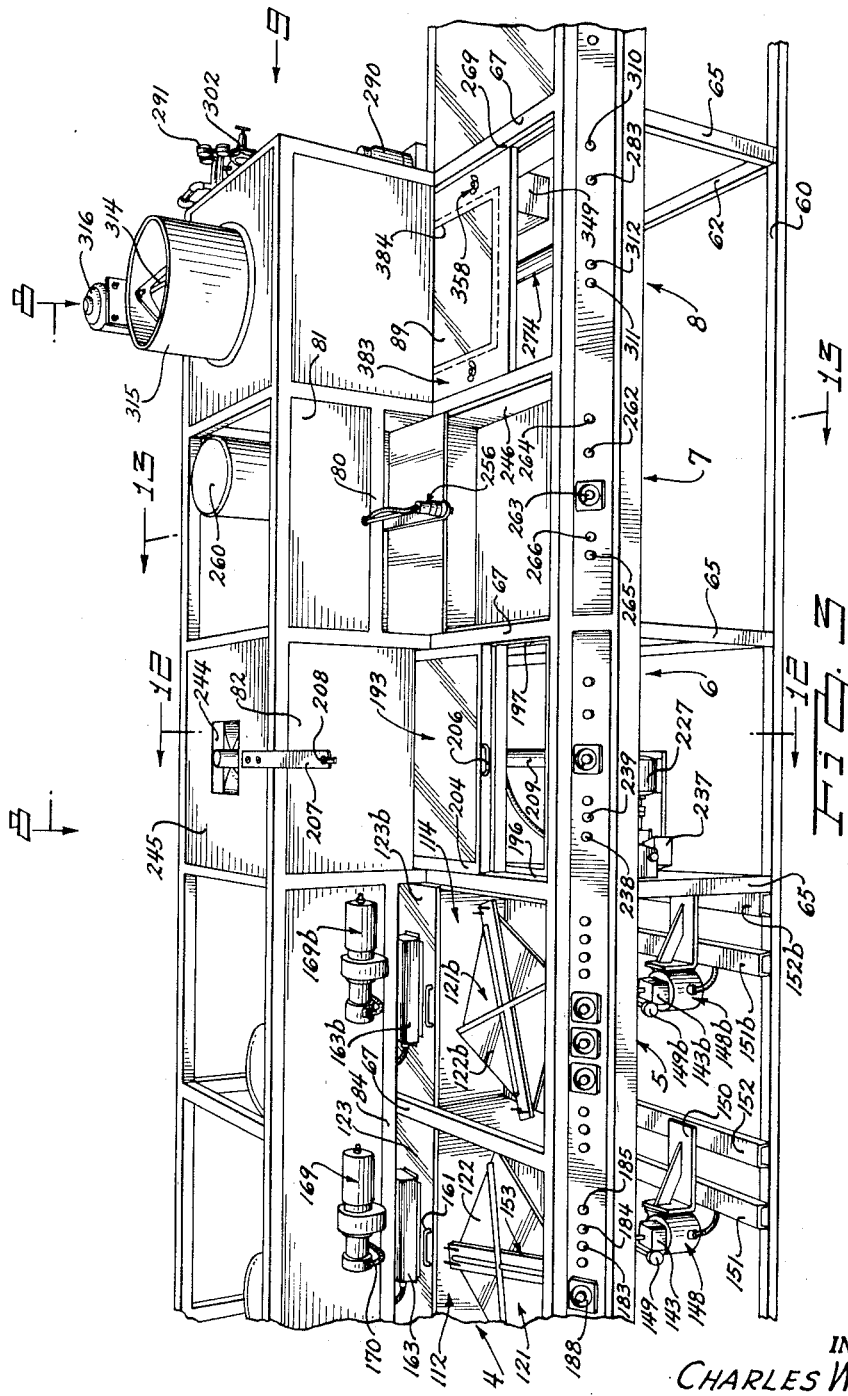
FIG. 3 is a front perspective view of the structure illustrated in FIG. 2, and looking down on machine Stations 4, 5, 6, 7 and 8.

The main frame structure includes the elongated, horizontally disposed, laterally spaced apart tubing rails 60 and 61 which are adapted to engage the supporting floor surface of the building in which the machine is installed. The elongated longitudinally disposed rails 60 and 61 are fixedly interconnected by a plurality of longitudinally disposed, ground engaging, interconnecting tubes as 62 so as to form a frame base section. The main frame structure further includes an upper or station supporting frame section comprising the transversely spaced apart, longitudinally extending tubing rails 63 and 64 which are vertically spaced apart from and in alignment with the longitudinal rails 60 and 61, respectively. As shown in FIGS. 1, 2 and 3, the upper frame rail 63 is supported by means of a plurality of longitudinally spaced apart, vertically disposed legs 65 which are formed from the aforementioned square tubing and which engage the underside of the rail 63 and the top side of the lower rail 60. The rear upper frame rail 64 is supported by means of a plurality of longitudinally spaced apart, vertically disposed legs made from the aforementioned square tubing and indicated by the numeral 66. As best seen in FIG. 1, the upper longitudinal frame rails 63 and 64 are fixedly interconnected by the transversely disposed, laterally spaced apart tubes 67. The transverse tubes 67 are spaced so as to form a separate work station between two adjacent tubes 67 for mounting the work station equipment therebetween, as more fully explained hereinafter.

Figure 9:
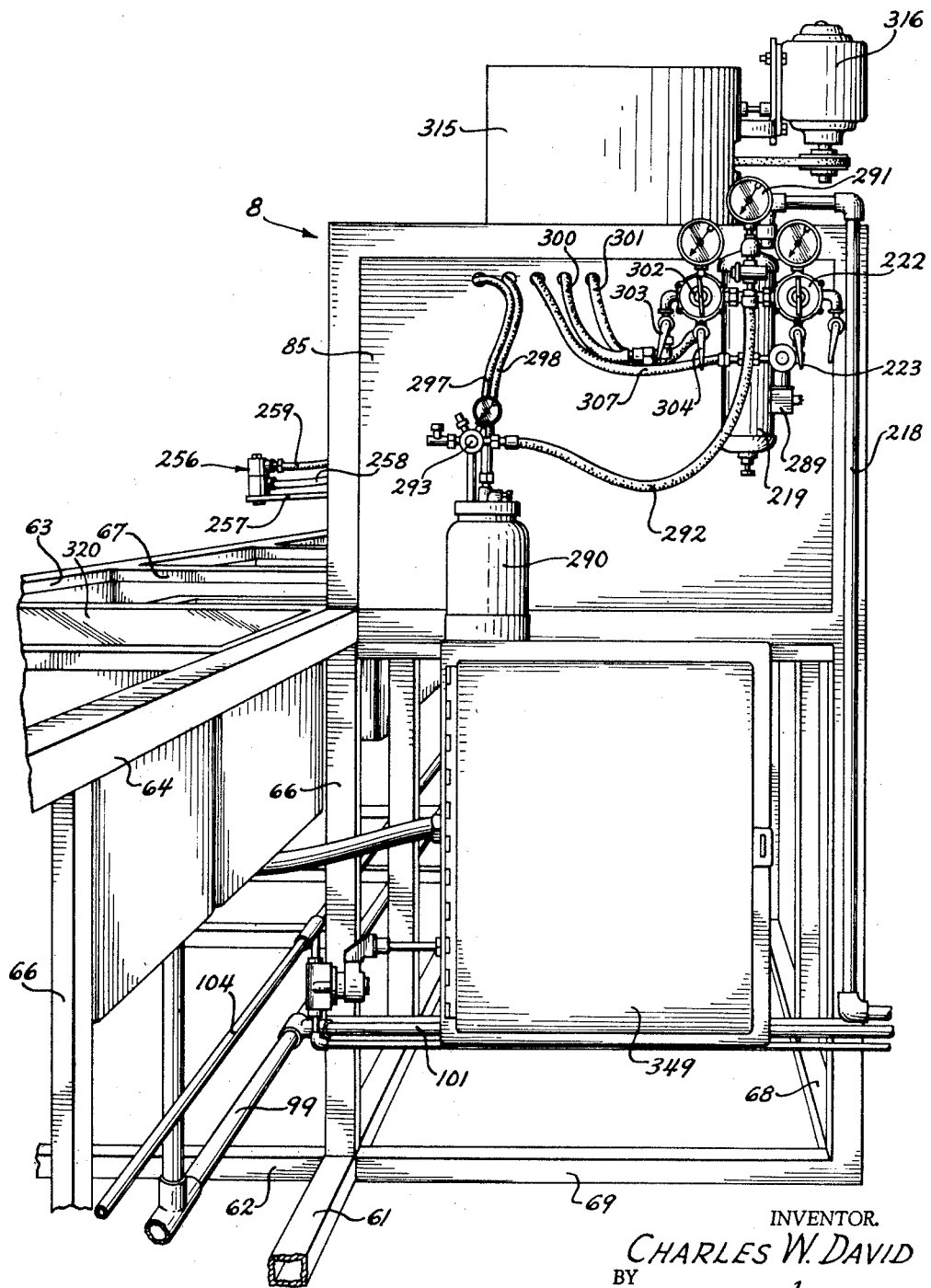
FIG. 9 is an enlarged, elevational perspective view of the structure illustrated in FIG. 3, and taken in the direction of the arrow marked "9"

As shown in FIGS. 1, 2, 9 and 11, the illustrative machine further includes a rear portion in its main frame which is disposed at Stations 4, 5, 6, 7 and 8 and which extends upwardly above the front portions of the stations. The rear frame portion includes a longitudinally extended rail 68 which is disposed in the same horizontal plane as the other base rails 60 and 61 but which is disposed rearwardly of the rail 61 and interconnected therewith by means of a plurality of longitudinally spaced apart, transversely disposed tubes 69. Fixedly mounted on the longitudinally extended base rail 68 is the upwardly disposed intermediate longitudinal rail 70 which is horizontally aligned with the frame rail 63 and 64, and vertically aligned with the base rail 68. The frame rail 70 is supported by means of a plurality of vertical, longitudinally spaced apart legs 71 which are made from the aforementioned square tubing and which are seated on top of the longitudinal rails 68 and fixedly connected thereto, and which are connected at the upper ends thereof to the underside of the longitudinal rails 70. As best seen in FIGS. 2, 3, 11 and 13, the back frame longitudinal rail 70 is fixedly interconnected by a plurality of transversely disposed, longitudially spaced apart, horizontal tubes 72 which have one end connected to the rail 70 in the rear frame and the other end thereof connected to the rail 64 in the front frame portion. The rear frame portion extends upwardly above the front frame portion and includes the front edge longitudinally extended rail 73 which is spaced apart vertically above the longitudinal rail 64 and interconnected therewith by means of a plurality of longitudinally spaced apart, vertically disposed legs 74. The rear frame portion further includes the upper rear edge longitudinal rail 75 which is vertically spaced above the rail 70 and interconnected therewith by means of a plurality of vertically disposed, longitudinally spaced apart legs 76 which are made from the aforementioned square tubing. The longitudinal rails 73 and 75 are further interconnected by the horizontal transversely disposed, longitudinally spaced apart tubes 77. As shown in FIG. 14, the front side of the rear frame portion is enclosed along the upper part thereof by means of the sheet metal covering 78 which is fixedly secured, as by welding, between the rails 79 and 73. As shown in FIG. 2, the front side of the upper end of the rear frame structure is also enclosed at Station 7 between the upper horizontal rail 73 and the downwardly spaced apart horizontal rail 80, by means of a suitable light metal plate as 81. The upper front side of the rear frame structure is also enclosed at Station 6 by means of the light metal plate 82. As shown in FIGS. 2 and 3, the front upper side of the rear frame is also enclosed at Stations 4 and 5, by means of the light metal plate 83 which extends downwardly from the longitudinal rail 73 to the short intermediate horizontal rail 84. As shown in FIG. 9, the right end of the rear frame structure is enclosed along the upper end thereof by means of the light metal plate 85. The left upper end of the rear frame structure is also enclosed by a similar light metal plate as 86, shown in FIG. 11.

The structure of Stations 1 through 13 will now be described in detail. Station No. 1 of the illustrative machine is used for load storage for the plastic material which is to be processed. It contains the four shelves 87 which are capable of holding a predetermined amount of plastic, as for example, 300 pounds each. The shelves 87 are made from any suitable material and are fixedly mounted between the front vertical legs 65 and the rear vertical frame legs 66. The upper surface of the Station No. 1 is covered by any suitable material so as to form a fifth shelf or working surface 88 where the operator removes the pieces of plastic material and readies them for movement to the next station, namely Station No. 2.

Station No. 2 is a cleaning station and it is used to clean any foreign material from the sheet of plastic. FIG. 23 illustrates a square piece of plastic 89 which illustrates a sheet of plastic of the type that is processed by the machine of the present invention. The numeral 90 indicates a first design and the numeral 91 indicates a second design. The designs 90 and 91 make a composite design and are merely illustrative of designs and written material that may be etched into the plastic sheet 89 by processing it through the machine of the present invention. The machine of the present invention may be employed to color etch any plastic materials which may be etched by etching formulations described in detail hereinafter. For example, plastics which may be etched by the present machine are polyvinyl chloride, cellulose acetate butyrate, methyl methacrylate, and polystyrene.

Figure 10:
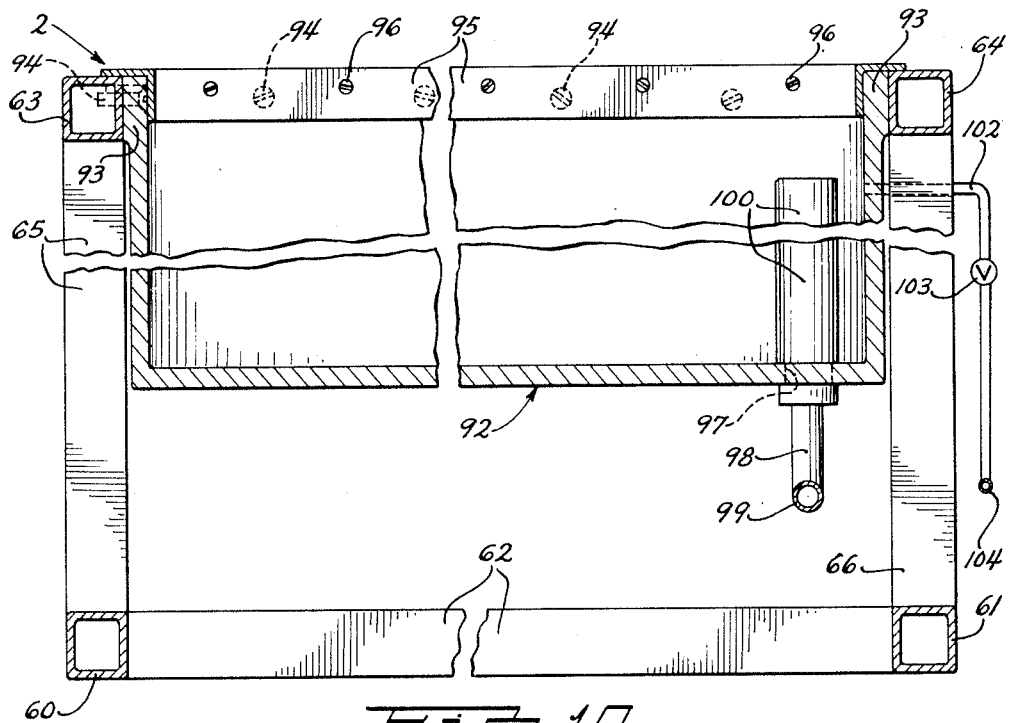
FIG. 10 is an enlarged, broken, elevational sectional view of the structure illustrated in FIG. 1, taken along the line 10—10 thereof, looking in the direction of the arrows, and showing machine Station No. 2.

As shown in FIGS. 1 and 10, Station No. 2 is provided with a tank or sink generaly indicated by the numeral 92. The tank 92 is approximately twelves inches deep and thirty inches square. The walls of the tank 92 are approximately one-half inch in thickness. The tank 92 is made out of a fibre glass coated with an epoxy resin. This tank is provided with a heavy epoxy pigmented paint around the outside coating thereof to prevent damage from various chemicals. As shown in FIG. 10, the upper peripheral edge of the walls of the tank 92 are enlarged as indicated by the numeral 93 and this enlarged portion is seated against the longitudinal rails 63 and 64 and the two transverse rails 67. The tank 92 is fixedly secured to the rails 63 and 64 and the transverse tubes 67 by any suitable means as by the screws 94. An aluminum angle molding 95 is fixedly secured around the upper edge of the tank 92 and is fixedly secured in place by any suitable means as by the screws 96. The aforedescribed tank structure 92 for Station No. 2 is illustrative of the tanks which are used in Stations 3, 4, 5, 7, 10, 11 and 12. The tanks in the last mentioned stations are constructed in the same manner as tank 92.

As shown in FIGS. 1, 10 and 20, the tank 92 is provided with a suitable drain 97 in the bottom wall thereof which is connected by means of the vertical drain pipe 98 to the longitudinally extended main drain pipe 99. The drain pipe may be of any suitable size, as for example, a pipe having ⅞ of an inch inner diameter. As shown in FIG. 10, the tank 92 is provided with the overflow pipe 100 which is connected by any suitable means over the drain 97 and which extends upwardly from the bottom wall of the tank 92 approximately six inches. As shown in FIG. 20, the drain pipe 99 is adapted to be connected to a suitable drain system indicated by the numeral 101.

As shown in FIGS. 1, 10 and 20, the tank 92 is provided with a water inlet pipe 102 which is provided with a shut-off valve 103. The water intake line 102 is connected to the main pipe 104 of the water intake system. As shown in FIG. 21, the water intake main line 104 is connected to the incoming hot water and cold water lines 107 and 109, respectively, by means of the vacuum bleeder valves 108 and 110, the hot and cold water mixer 106 and the electric solenoid flow control valve 105.

In the aforedescribed water inlet system, it has been found desirable to use a one-half inch outer diameter copper tubing. The water drain system has been found to operate satisfactorily with a one inch outer diameter copper pipe for the drain pipes 98 and 99. The normal water consumption of the machine is approximately three gallons per minute.

Station No. 3 is a coating station where the plastic material is dipped in a suitable coating solution to provide a surface coating of "Photo-Flo" and water. Station No. 3 is provided with a tank generally indicated by the numeral 111 in FIGS. 1 and 20. The tank 110 is the same size tank as tank 92 in Station No. 2 and is provided with the same drain and water supply outlets and inlets, respectively, and they are indicated by the same reference numerals in FIGS. 20 and 21, followed by the small letter "a." The term "Photo-Flo" is the trademark under which is sold a wetting solution having one part glycerin and 15 parts water as the elements thereof and which is sold by the Kodak Company, of Rochester, New York. Any suitable solution of this type may be used for coating the plastic material with the primary coating at Station No. 3. The sheet of plastic material is left in the solution of Station No. 3 for approximately thirty seconds so that the solution can thoroughly cover the entire surface thereof. The sheet of plastic material is then picked up wet from the tank at Station No. 3 and carried to Station No. 4 which is the final coating station.

Station No. 4 may be termed the final coating and whirling station. Station No. 4 is provided with the tank generally indicated by the numeral 112 which is provided with a drain pipe 113 which connects it to the drain line 99. Station No. 5 is identical to Station No. 4 and the reason for this is that the operation performed at these stations is the slowest portion of the entire process. Therefore, by providing two similar stations the entire processing of a large number of plastic sheets is speeded up. The Station No. 5 is also provided with a tank 114 which has a drain line 115 connecting it to the drain line 99. The tanks 112 and 114 are constructed identical to the tank 92 as described in detail under the description of Station No. 1. As shown in FIG. 21, the tanks 112 and 114 are connected to the water inlet system by means of the inlet pipes 116 and 117, respectively, which are in turn connected, by suitable piping and the shut-off valve 118, to the main inlet pipe 104. The water inlet is automatically controlled by means of the electric solenoid valves 119 and 120 as more fully described hereinafter in the detailed description of the control system of the machine. There are three operations which are automatically carried out in each of these Stations Nos. 4 and 5. The first operation is that the water system is automatically operated to permit water to enter for a certain period, the second operation is that the coating itself is metered through a special valve for a predetermined time, and the third operation being the amount of rotation time of the piece of plastic material which is controlled by the timer, and all these operations will be described in detail hereinafter.

The structure of Stations 4 and 5 will now be described in detail. Since the structure of these stations is the same, the structure of Station No. 4 will be described and the same parts in Station No. 5 will be marked with corresponding reference numerals followed by the small letter "b." As shown in FIGS. 2, 3, 4, 5, 7 and 11, Station No. 4 is provided with a rotating table generally indicated by the numeral 121 and which is provided with an upper platform 122 that rotates in a horizontal plane at a distance of approximately seven inches below the cover plate generally indicated by the numeral 123. The platform 122 is fixedly mounted by any suitable means as by the screws 124 to the plate 125 which is fixedly secured to the top end of the vertical shaft 126 by any suitable means. The platform 122 may be made from any suitable material but in the illustrative embodiment it is made of aluminum and to a thickness of one-quarter inch. The platform 122 may be removed for cleaning purposes by removing the screws 124. As shown in FIG. 11, the platform vertical shaft 126 is suitably journalled in the sleeve bearing member 127 which is carried on the top of the annular member or tubing 128 which is provided with the flange 129 that is in turn secured to the bottom wall of the tank 112 by any suitable means.

As shown in FIG. 11, the rotating table shaft 126 extends downwardly through a suitable hole in the bottom wall of the tank 112 and through a thrust bearing assembly generally indicated by the numeral 130. The thrust bearing assembly 130 is supported by means of the longitudinally disposed tubes 131 and 132 which are carried by suitable transverse tubes as 147 which are fixed between the front and rear frame vertical legs 65 and 66. The thrust bearing assembly 130 includes the cup shaped member 133 which is bolted to the horizontal plate 144 that is in turn fixed to the tubes 131 and 132 by means of the vertical plates 145 and 146. The plates 145 and 146 are secured to the tubes 131 and 132 by any suitable means as by bolting. As shown in FIG. 11, a lower thrust bearing race 134 is carried inside of the member 133 and supports the bearings 136 on the top of which is mounted the upper thrust bearing race 135. The rotating table shaft 126 is reduced as at 137 to provide a shoulder which is seated on the upper thrust bearing race 135. The table shaft 126 is reduced below the shoulder 137 to the size indicated by the numeral 138 and this reduced shaft portion extends downwardly through suitable holes formed in the thrust bearing assembly 130 and the lower thrust bearing race 134. The reduced shaft section 138 extends below the thrust bearing assembly 130 and is fixedly secured to the coupling plate 139 by any suitable means as by a set screw. As shown in FIG. 11, the coupling plate 139 is secured by means of the dowel 140 to the coupling plate 141 which is fixedly secured to the output shaft 142 of a variable drive unit 143 which is operatively connected to an electric motor as 148. The motor 148 is preferably a one-sixth horsepower motor and the variable drive unit 143 provides a speed of from 0 to 400 r.p.m. A suitable variable drive unit 143 is one available on the present market and sold by the Xeromax Corporation, however, any suitable available drive unit that gives the 0 to 400 r.p.m. speed variation will be sufficient.

Figure 4:
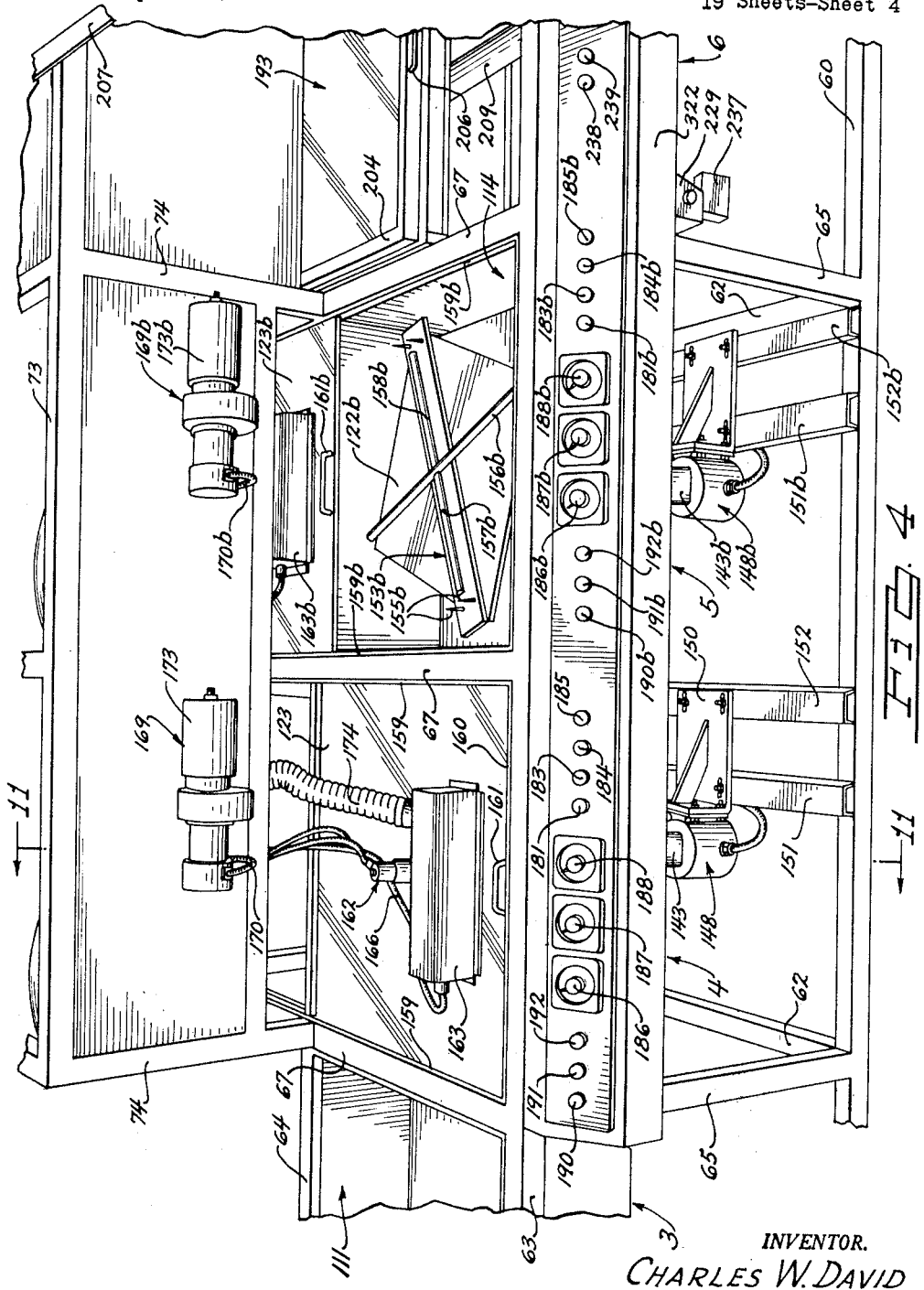
FIG. 4 is an enlarged, fragmentary, front perspective view of the left end of the structure shown in FIG. 2, and looking down onto machine Stations 4 and 5.
Figure 5:
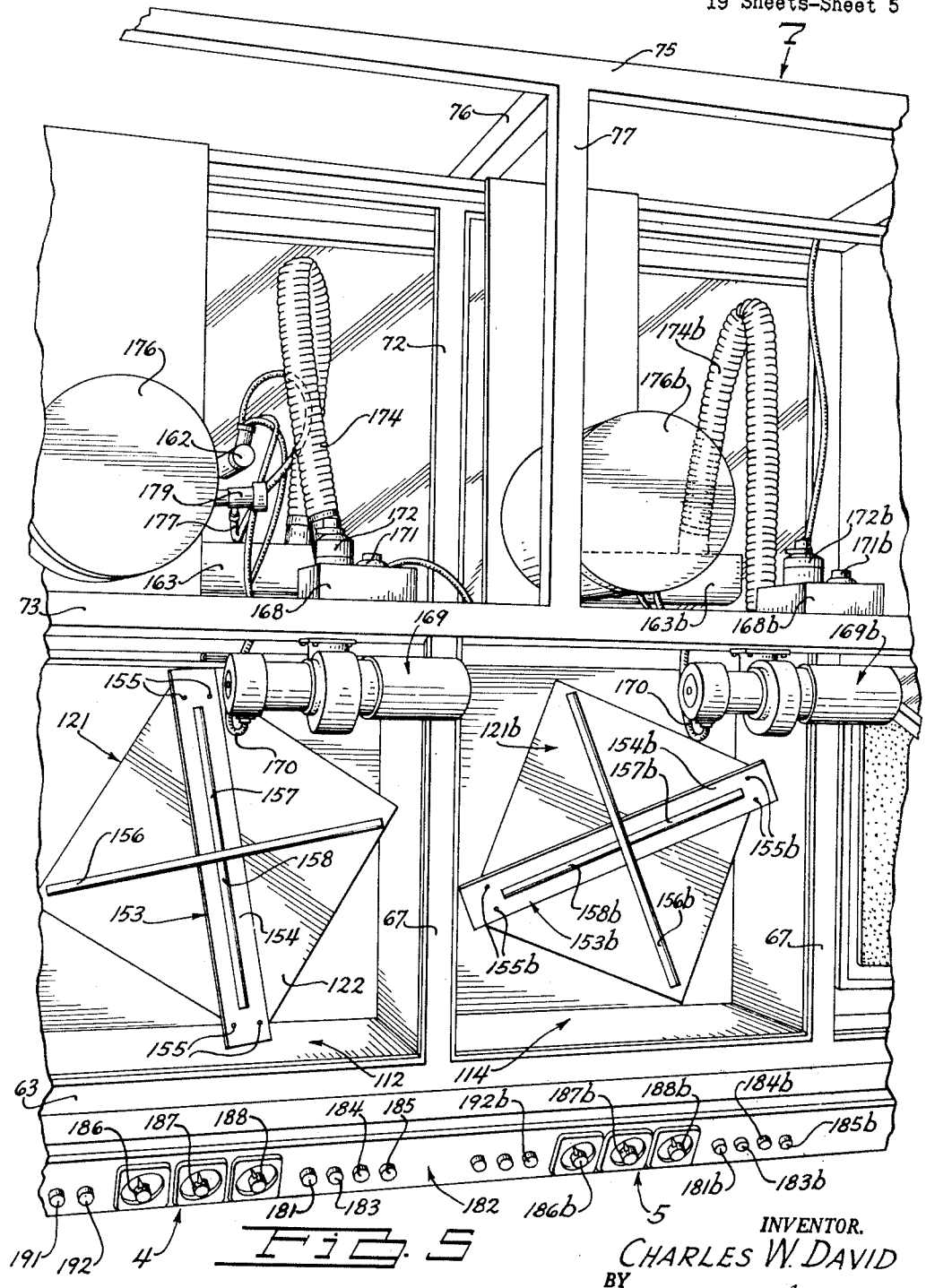
FIG. 5 is an enlarged, fragmentary, top perspective view of the structure illustrated in FIG. 2, taken along the line 5—5 thereof and looking in the direction of the arrows.

It will be seen that the speed of the rotating platform 122 may be adjusted as desired by means of the variable speed unit 143 which has the hand adjusting control member 149 for adjusting the same, as shown in FIGS. 2 and 3. The rotating platform 122 may also be cleaned by removing the set screws for the coupling plate 139 and lifting upwardly on the rotating table where the shaft 126 will slide upwardly and out of its mounting assembly. As shown in FIGS. 2, 3, and 4, the drive motor 148 is fixedly secured to the mounting plate 150 which in turn is fixedly secured by any suitable means as by bolting to the two transverse channels 151 and 152. The last mentioned channels are welded to the two longitudinal frame rails 60 and 61. As best seen in FIGS. 4 and 5, a jig generally indicated by the numeral 153 is fixedly mounted on the rotating table by any suitable means as by bolting. The illustrative jig 153 is adapted to hold in place a piece of plastic as shown in FIG. 23. The jig 153 includes the elongated board 154 which is fixed on the platform 122. A pair of spaced apart nails as 155 is disposed in each end of the board 154 for retaining therebetween a corner of a piece of plastic material. A cross bar in the form of a round elongated piece of wood is fastened on the wood piece 154 in a position normal thereto and two similarly formed but shorter pieces of wood as 157 and 158 are mounted on the board 154. The jig 153 is normally made of wood because it is normally replaced for each differently shaped plastic sheet since each sheet varies in size, style, thickness, etc. For standard processing on standard plastics, the platform 122 is rotated at 300 r.p.m.

As shown in FIGS. 4 and 11, the Station No. 4 is provided with the aluminum channels 159 along the inner sides of the tank 112 adjacent the upper edge thereof so as to form a track or sliding the cover 123 forwardly and backwardly. A similar aluminum channel 160 is disposed along the inner upper edge of the tank 112 for receiving the forward end of the cover 123. The cover 123 is provided with the handle 161 at the forward end thereof for sliding the cover inwardly and outwardly. The cover 123 is preferably made from a transparent plastic material as Plexiglas. FIG. 4 shows the cover 123 for Station No. 4 moved to the outward position and Station No. 5 of FIG. 4 shows the cover 123b moved to the inward position to permit loading of the station.

Figure 7:
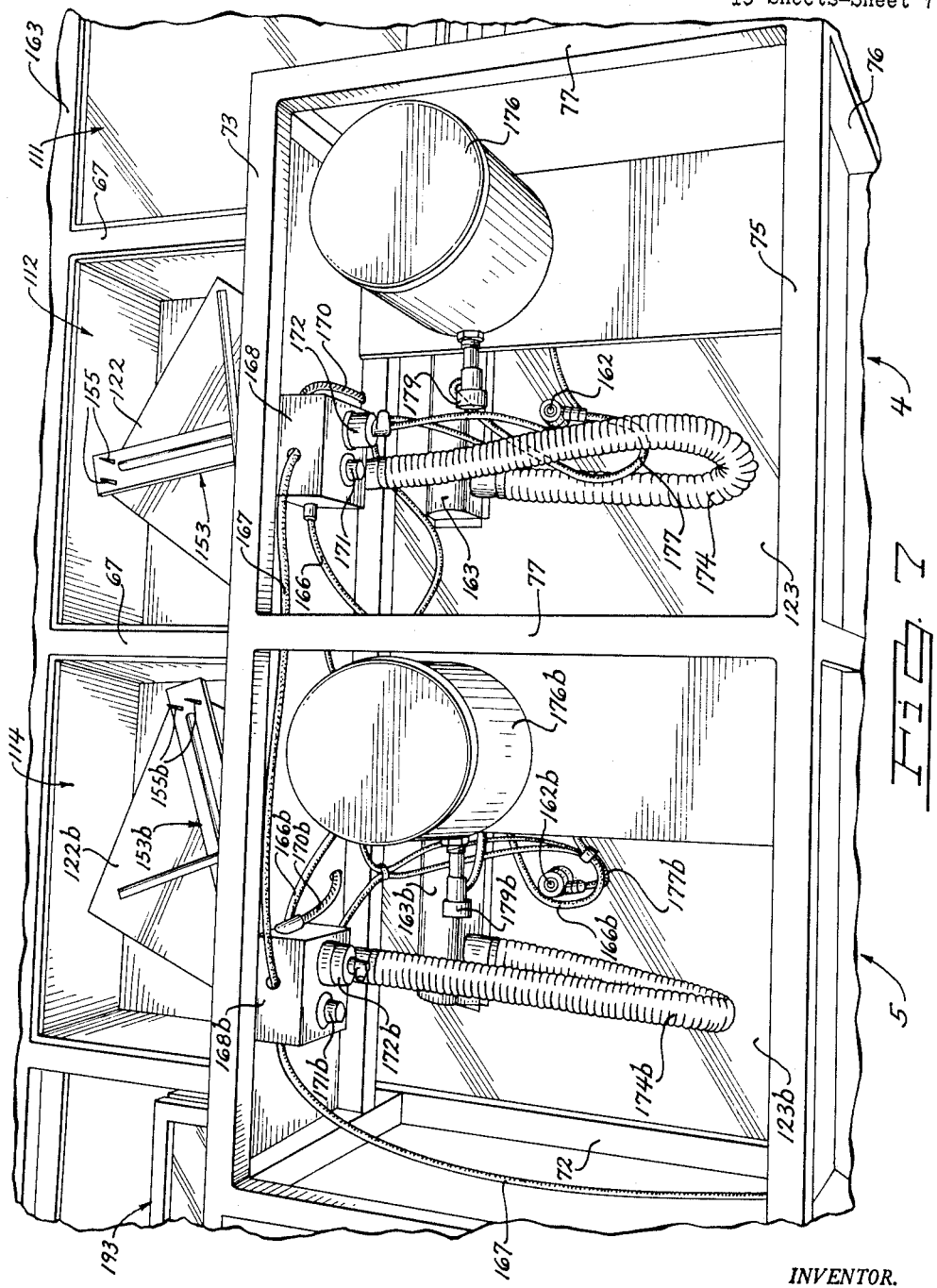
FIG. 7 is a fragmentary, top rear perspective view of the structure illustrated in FIG. 5, taken in the direction of the arrow marked "7"

As best seen in FIGS. 4, 5, 7 and 11, the cover 123 carries a solenoid operated valve 162 and a heat hood 163. The heat hood 163 is an elongated inverted U-shaped member which is closed at the ends thereof and open on the lower end thereof. Operatively mounted in the heat hood 163 by any suitable means are two conventional Calrods that are rated at 600 watts each. As shown in FIG. 11, the heat hood 163 is fixedly mounted on the top of the cover 123 by any suitable means, and it is disposed over the elongated hole 165 formed through the cover 123 for communicating the heat hood 163 with the tank 112. Electrical power is supplied through the Calrods 164 by means of the electric cable 166. As shown in FIG. 7, the electric cable 166 is connected to the lead wire 167 which is adapted to be connected to a suitable source of power, as more fully explained hereinafter, at one end thereof and which is connected at the other end thereof to suitable terminals in the switch box 168.

As shown in FIGS. 4 and 7, Station No. 4 is provided with a suitable electrically driven turbine blower 169 which is connected by means of the lead wire 170 to the switch box 168. The lead wire 170 is connected by means of the rheostat 171 to the power line 167. The rheostat 171 controls the blowers from 10% to 100%. The switch 172 is a four-way switch adapted to control the amount of voltage to the Calrods 164 to produce the various desired heats, and the positions on this switch are marked "low," "medium," "high" and "off." Any conventional four-way switch will function in the place of the switch 172. The four-way switch 172 provides all of the needed flexibility for supplying heat for work on any type of plastic having certain heat factors. The blower 169 is provided with an air filter unit 173. The blower 169 is connected by means of the two inch flexible rubber hose 174 to the heater hood 163. In one working embodiment, the heat hoods were approximately 14 inches long, three and one-half inches wide and three and one-half inches deep. In the same embodiment the blower 169 was fifteen inches in over-all length and was provided with a six inch diameter impeller which was two and one-half inches wide. The heaters formed by the blowers 169 and the cal units 164 are adapted to run at all times when the control circuit of FIGS. 17 and 18 is energized by the master start switch 175. The heaters will dry the coating put on the plastic at this station in approximately two and one-half to three minutes.

As shown in FIGS. 4, 5 and 7, the solenoid operated valve 162 is connected to a reservoir 176 by means of a plastic vinyl tube 177. The valve 162 is made from stainless steel and meters the coating fluid which is dropped downwardly through the valve nozzle 178. The valve 162 is provided with a three-eighths of an inch orifice which opens to allow the fluid to pass at gravity pressure. A suitable valve for this type is one put on the market by the Skinner Electric Valve Division, of the city of New Britain, Connecticut, and is available under the model number of V5D1590C. It operates on 115 volts at 60 cycles. Its maximum power draw is 10 watts. As shown in FIG. 7, the reservoir 176 is provided with a metering device 179 which may be adjusted to provide as many gallons per minute of coating fluid as is necessary for any particular job. Normally, the metering device 179 is left in the wide open position to permit maximum flow volume. The reservoir 176 is adapted to hold five gallons of coating fluid. The reservoir 176 is preferably made from polyethylene and is provided with a loose cover to prevent dust and dirt from entering the same. The valve 162 is adapted to open when the cover 123 is closed, as more fully explained hereinafter, to allow a certain amount of the coating fluid to drop onto the plastic sheet held on the platform 122. The spinning of the platform 122 spreads the coating fluid over the entire surface of the sheet of plastic material. As shown in FIGS. 5 and 11, the solenoid of valve 162 is connected by the lead wire 180 for operating the same, as more fully explained hereinafter, when the electrical control system is explained. The coating material which is held in the reservoir 176 and directed onto the plastic material for coating the same, may be any suitable light sensitive material as, for example, a positive albumen coating. The positive albumen may be readily purchased on the market in any store selling supplies for lithography work, since a solution of this type is well known and used in such work. A preferable thickness of albumen coating is approximately one thousandths of an inch.

Figure 22:
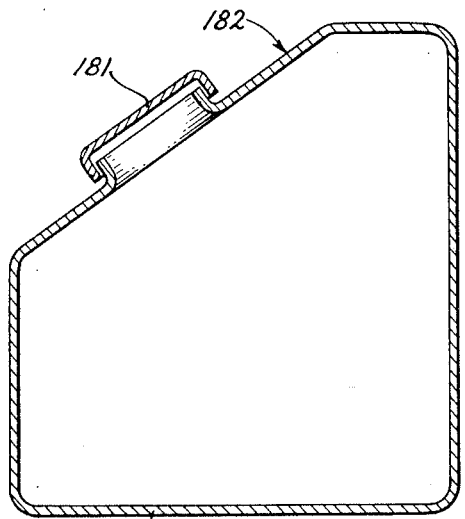
FIG. 22 is an enlarged elevational sectional view of the push button control panel structure employed in the machine of the present invention, taken along the line 22—22 of FIG. 6, and looking in the direction of the arrows; and, FIG. 23 shows a sheet of plastic material which may be processed by the machine of the present invention to color etch thereon the illustrative design.

The operation of Station No. 4 will be described hereinafter in detail when the electric control system is described, but it will suffice at this time to briefly point out that the plastic material will be first placed on the jig 153 and the cover is then closed. The operator presses the automatic start switch 181 which is mounted in front of the station on the control panel 182. As shown in FIG. 22, the control panel 182 has a downwardly and outwardly sloping face on which are mounted the various operating buttons and timers, as more fully explained hereinafter. The control panel 182 is fixedly secured to the front side of the frame rail 63 by any suitable means as by bolting. When the automatic starting button 181 is pressed, the valve 162 will be opened to permit a small amount of coating fluid to drop to the plastic sheet of material. When the automatic switch 181 is pressed, the automatic cycle light 183 will go on showing that the machine is functioning on automatic control at this station. The platform 122 is also started and will spin so as to spread the coating fluid over the entire surface of the plastic piece of material. When this Station 4 has finished cycling it will stop and a pilot light 184 will light to indicate that the cycle is complete. The numeral 185 indicates a stop button for stopping the cycling action at this station if desired.

As shown in FIG. 5, there is also provided at this station the three timers 186, 187 and 188. The timer 186 controls the operation of the inlet water valve 119 so as to open the same during the cycling period for a desired period of time. The water admitted through the valve 119 is used for washing this station, and the washing action is controlled by the timer 186 to permit a washing time of from zero to 150 seconds. The coating time during which the valve 162 is operated is controlled by the surfacer "on" timer 187. The timer 188 controls the amount of rotation time of the rotating table 121, and this time may be controlled from zero to 60 minutes. The timers 186, 187 and 188 may be adjusted once before the operation begins and then they will continue to operate automatically. These timers are conventional, and any suitable type may be used. As shown in FIG. 17, the limit switch 189 is adapted to be disposed on the machine in such a position so that it will be operated when the cover 123 is moved to the closed position to permit the automatic start button 181 to be operated.

As shown in FIG. 4, Station 4 is provided with the three manual controls indicated by the numerals 190, 191 and 192. These manual controls are of the push button type, and are interconnected with the automatic control system as shown in FIG. 17 and as more fully explained hereinafter. These controls will bypass the timers 186, 187 and 188, and may be used for set-up purposes, for cleaning and for checking purposes. These controls are always ready to function in case the automatic controls become inoperative. The stop switch 185 may be used to stop the sequence of operation at the station at any point in the event of danger and so forth. When the station cycle is finished, the cycle complete light 183 will go on and all operating parts at that station are stopped. The manual water "on" button 190 is used for cleaning purposes. It is not used for processing of sheets of plastic. The manual surfacer "on" button will initiate the solenoid valve 162 allowing the coating solution to fall onto the plastic sheet held on the jig 153. These buttons will maintain the water "on" valve 119 and the surfacer "on" valve 162 in the open positions so long as they are depressed. The manual whirler button 192 is adapted to start the motor 148. The switch button 192 may also be used as a jog button by depressing it momentarily and it may also be used to continue the rotation of the table by keeping it depressed.

Station No. 5 is also a coating and whirling station, and is a duplicate in every detail of Station 4. As previously mentioned, the identical parts of Station 5 are marked with reference numerals corresponding to those used to describe the parts of Station 4 followed by the small letter "b."

Station No. 6 may be termed the "exposure" station since it is used to expose the coating applied to the plastic in Stations 4 and 5, and in various areas as determined by the master copy of the design or written material which is to be etched on the plastic. As best seen in FIGS. 2, 3, 8 and 12, this station is provided with a transfer table and a vacuum system for holding the master copy of the design and so forth on top of the plastic material to be etched while the exposure action is taking place. The vacuum chamber transfer table 193 is provided with a pair of rollers as 194 and 195 on each side thereof, and these rollers are adapted to ride in the tracks 196 and 197 formed on opposite sides of the Station 6. The tracks 196 and 197 are formed from any suitable material as, for example, from aluminum channel members fixedly secured to the machine frame. The vacuum chamber transfer table 193 is a standard type table, and any suitable type may be used. A conventional table of this type which is available on the market is one sold by the Robertson Photo-Mechanix, Inc., Chicago, Illinois. The vacuum transfer table 193 operates on a vacuum 1 to 20 inches of mercury. As shown in FIG. 12, the table 193 includes the steel plate 198 which is adapted to support the rubber vacuum blanket 199 in an upwardly spaced apart position by means of the frame structure 200. The steel plate 198 is provided with legs on each side thereof as 201 and 202 which carry the rollers 194 and 195, respectively. A sheet of plastic material as 89 is placed on top of the vacuum rubber blanket 199 and the master template is placed on top of this sheet of material. The master would be drawn on a sheet of transparent material, as a transparent plastic or the like, and would show the design as 90 and 91 in India ink, or the like, so that when the piece of plastic is exposed to a source of light, the coating on the piece of material to be etched will be exposed except in that portion underneath the inked design on the master template.

The vacuum chamber transfer table 193 is further provided with a glass shield which is swingably mounted on the upper side thereof for enclosing the upper side of the table during an exposure operation. As shown in FIGS. 1 and 12, the glass shield comprises the glass plate 203 which is suitably mounted in the rectangular frame 204. The frame 204 is hingedly mounted along the rear end of the table 193 as at the point 205. The frame 204 is provided with a handle 206. As shown in FIG. 12, Station 6 is provided with the arm 207 which has the inner end thereof fixedly mounted to the top of the back frame, and the outer end thereof extended forwardly and outwardly over the front side of Station 6. The holding arm 207 is preferably made from plastic, and from a strip approximately two inches wide, three-eighths of an inch thick and twenty-four inches long. The holding arm 207 is provided on the outer end thereof with a holding hook 208 which extends approximately one inch below the bar 207 and one and one-half inches forwardly therefrom and which is operative to engage the handle 206 to hold the glass shield in an upwardly and open position as shown in FIG. 1. The overall dimension of the vacuum chamber transfer table 193 is approximately 29 inches in width and 25 inches in length.

Figure 8:
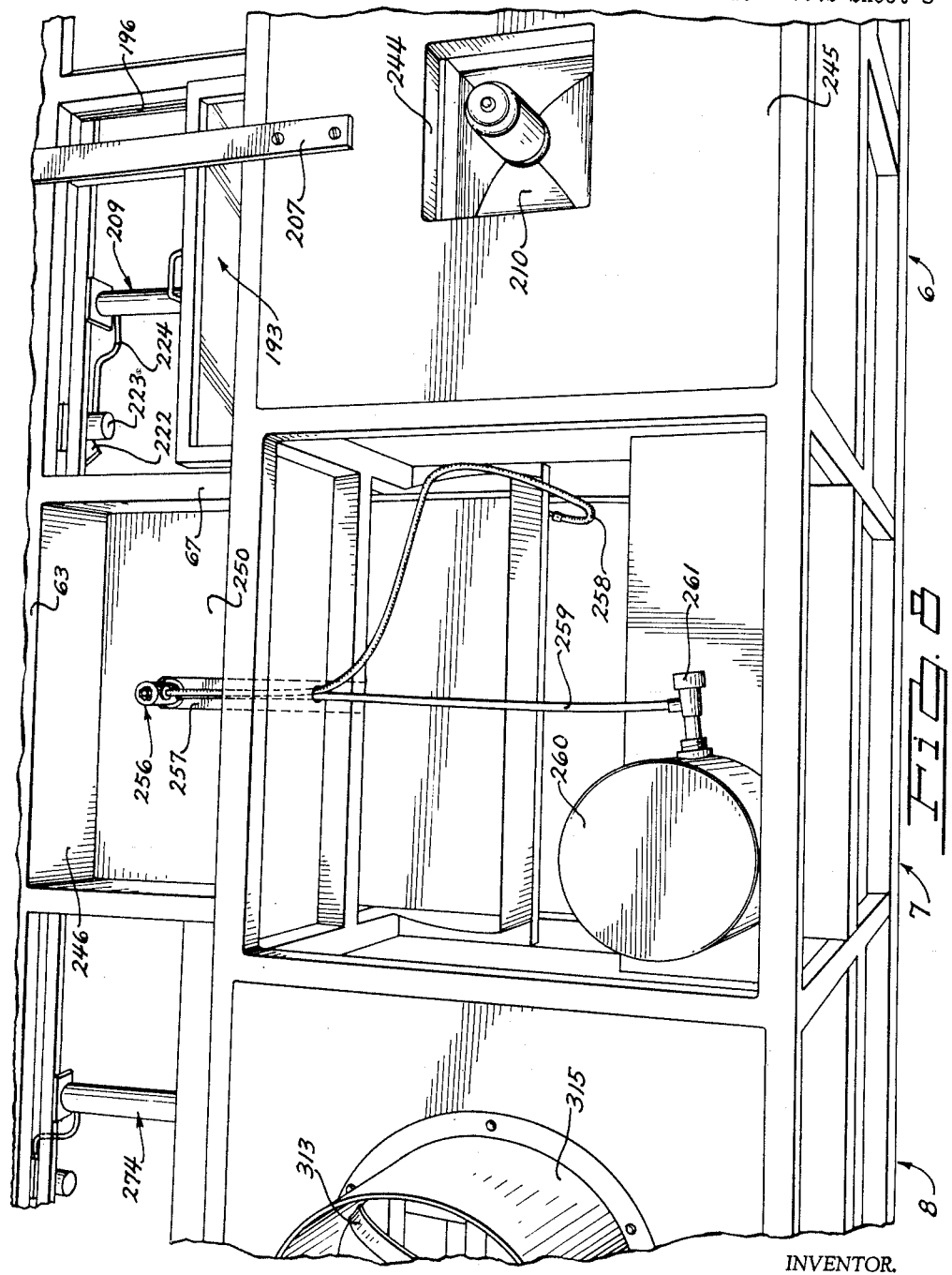
FIG. 8 is an enlarged, fragmentary, top rear perspective view of the structure illustrated in FIG. 3, taken along the line 8—8 thereof and looking in the direction of the arrows.

As shown in FIGS. 8 and 12, the vacuum chamber transfer table 193 is operatively connected to the air cylinder 209 which is adapted to move the vacuum chamber transfer table 193 inwardly under the exposure tube generally indicated by the numerals 210. The air cylinder 209 is fixedly connected in the horizontal position shown in FIG. 12 by any suitable means in the front end of the machine frame structure and below the table 193. The air cylinder 209 is provided with the usual piston rod 214 which is connected by means of the angle arm 211 and the lock nuts 212 and 213 to the table 193. The air cylinder 209 is of the type which is operated in one direction by air pressure and in the other direction by air return. As shown in FIGS. 12 and 19, the machine is provided with a compressor 215 which is adapted to be driven by the motor 216. The motor 216 may be a one-half horse power motor, and the compressor 215 may be any suitable conventional compressor. The compressor 215 maintains a working air pressure in the compressor tank 217 which in turn is connected by the conduit 218 to the reservoir 219. The reservoir 219 is connected by means of the conduit 220, the conduit 221, the pressure regulating valve 222, the shut-off valve 223 and the conduit 224 to the four-way solenoid operated valve 230. The valve 230 may be any conventional four-way solenoid valve which is operated as more fully described hereinafter in detail, and which is adapted to selectively convey pressurized air through either the conduit 231 or 232 to move the piston in the cylinder 209 inwardly or outwardly to move the table 193 inwardly or outwardly.

Figure 6:
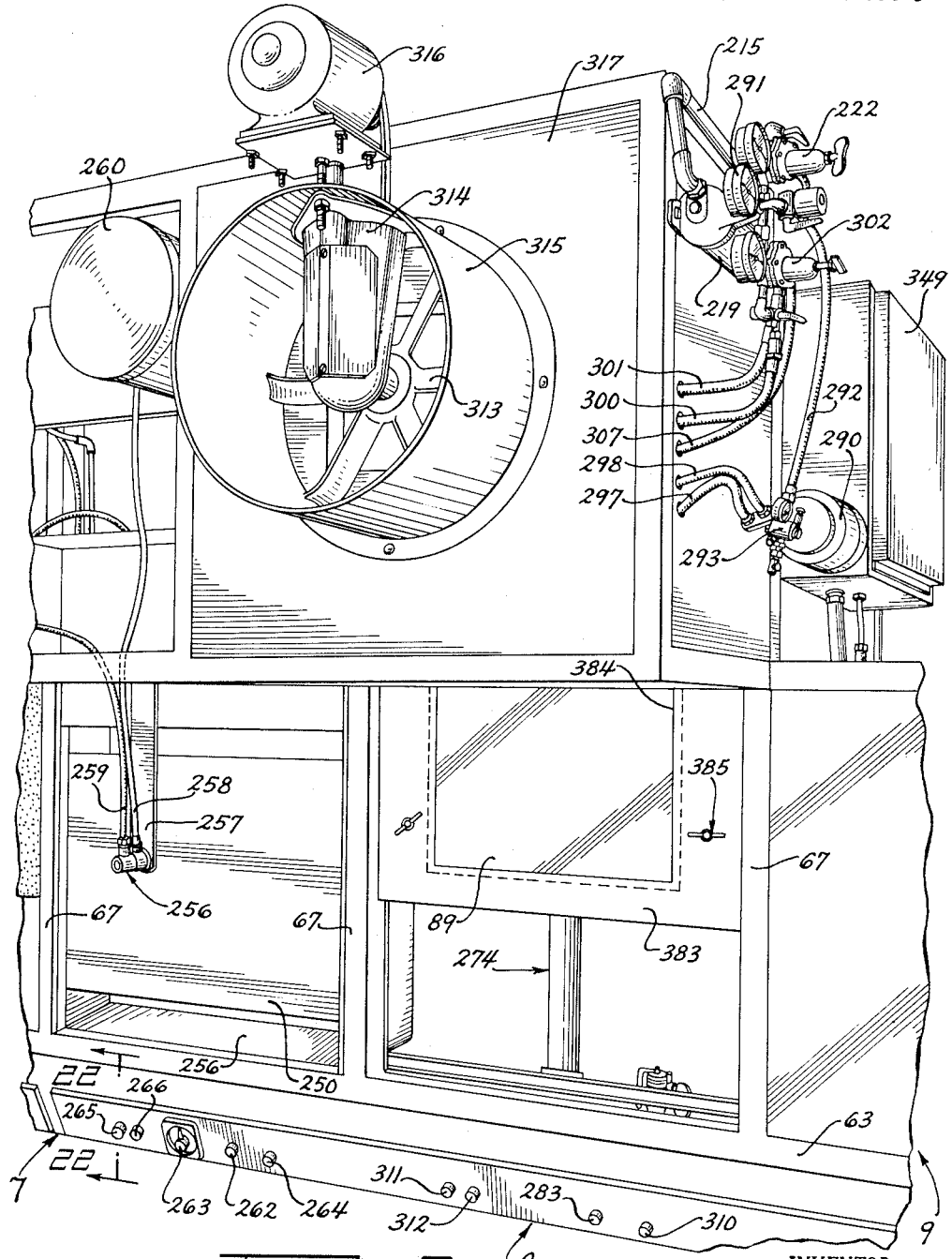
FIG. 6 is an enlarged, fragmentary, top perspective view of the structure illustrated in FIG. 2, taken along the line 6—6 thereof and looking in the direction of the arrows.

The vacuum chamber transfer table 193 is provided with vacuum by means of the tubing or conduit 225 which is connected into the space between the plate 198 and the rubber blanket 199. The conduit 225 is connected to the vacuum pump 226 as shown in FIG. 6. The vacuum pump 226 is driven by the electric motor 227, and these two units are mounted on the plate 228. The motor 227 may be any suitable one-sixth horse power motor. This vacuum unit runs continuously while the transfer table 193 is in motion and while an operation at this station is in process. As shown in FIG. 2, the vacuum gauge 229 is mounted on the front of the machine and in the conduit 225 to show the vacuum being exerted on the table 193. It will be understood that there is a suitable sealing strip mounted around the outer edge of the glass 203, and that this sealing strip engages the lower part of the table to provide a sealing action therebetween during an operation of this station. The vacuum pump 226 may be of any suitable make or type. As shown in FIG. 18, a vacuum control switch 233 is interconnected in the vacuum line for control purposes, as more fully explained hereinafter.

When a piece of plastic material has been loaded onto the rubber blanket 199, the glass cover is lowered and the automatic start button 234 is depressed. The vacuum inside of the transfer table will build up so as to close the vacuum switch 233 and the transfer table 193 will move inwardly under the exposure tube 210. The vacuum inside of the transfer table 193 may be varied from one inch of mercury to twenty inches of mercury depending on the accuracy required by the particular job. The exposure tube 210 is a 2000 watts Strobe unit with a reflector. The lamp 210 is mounted in a hood assembly to get the rays of the light as close as possible to the glass cover 203 and in perpendicular pattern. As shown in FIG. 2, Station 6 is provided with an automatic timer of the type employed in Stations 4 and 5 and indicated by the numeral 235. In the circuit of FIG. 18 this timer is also indicated by the indicia T7. The exposure timer 235 may be set to any desired time for keeping the transfer table 193 under the exposure tube 210. When the transfer table 193 is moved inwardly it contacts the limit switch 236 which energizes the timer 235, starts the exposure tube 210 and the part counter 237. The counter 237 may be of any suitable type, and it is adapted to count the number of sheets passing through Station 6. This station is provided with manual means for operating the station, as for example, the button 238 is provided to manually transfer the vacuum chamber transfer table 193 inwardly under the light 210. The numeral 239 indicates a button connected into the electrical control system to provide a means for manually energizing the vacuum system. This station is also provided with the manual exposure electrical control button 240 for testing the operation of the light 210. The station is also provided with the stop button 241 in order to stop the operation of the station in the event that there are any malfunctions in any part of the operation of this station. The light 210 is supported in the hood 242 which is in turn supported by suitable horizontal transverse arms as 243 which are connected to the frame longitudinal tubes.

Station No. 7 may be termed the pre-etch station which is the station where the unexposed part of the pattern or design is chemically removed. As shown in FIGS. 3, 6, 8 and 13, Station No. 7 is provided with the tank 246 which is constructed in the same manner as tank 112 in Station No. 1. As shown in FIG. 21, the tank 246 is provided with a suitable water inlet line 247 which is connected to the main inlet line 104 by means of the shut-off valve 248. Water is not used at this station during the pre-etch operation and it is only used for cleaning purposes. The tank 246 is also provided with the drain line 249 which connects this tank to the main drain line 99.

As best seen in FIG. 13, Station No. 7 includes a platform 250 which is disposed in the tank 246 and on which is laid the plastic material after it is removed from the previous Station No. 6. The plastic material would be clamped down to the platform 250 by any suitable means as by the clamps 251 which may be mounted along the sides of the tank and comprise air operated cylinder clamping means. The clamps 251 would be supplied with operating air from the air reservoir 219 as shown in FIG. 19, through the conduits 220, 221, the pressure regulating valve 222, the conduit 224, the conduit 252, the four-way reversing valve generally indicated by the numeral 253, and the conduits 254 and 255. The clamps 251 would be connected in parallel so that they would all operate simultaneously. Station No. 7 further includes a solenoid operated valve 256 identical to valve 162 which is used in Station No. 4. The valve 256 is mounted on the arm 257 which is fixedly secured to the machine backframe by any suitable means. As shown in FIG. 13, the valve is operatively connected to a suitable source of electrical power by means of the conduit 258. The valve 256 is connected by means of the tube 259 to the five gallon tank or reservoir 260 which is constructed in the same manner as the reservoirs 176 used in Stations Nos. 4 and 5. The tank 260 is provided with a metering unit 261 which is identical to the metering units 179 that are used in Stations 4 and 5.

After the operator has placed a sheet of plastic on the platform 250, he pushes the automatic start button 262 which is connected to the timer 263 which is of the type used in Stations 4 and 5. The valve 256 will automatically close the clamps 251 and also allow a predetermined number of ounces of pre-etching fluid to drop onto the sheet of plastic material and the number of ounces depends on the size of the workpiece. The operator next takes a pad or squeegee and rubs the pre-etch fluid over the entire surface of the piece of plastic material for approximately forty-five seconds. Then the remainder of the fluid is squeegeed off of the plastic material.

The pre-etch solution used in the operation at this station is a nitric acid solution comprised of nitric acid and oil. The nitric acid is a 15% solution. A suitable mixture would be one comprising approximately 60% of the nitric acid and 40% oil. A suitable oil for use in the pre-etch solution would be castor oil.

As shown in FIG. 6, Station 7 further includes the stop unclamp control button 264 and the manual pre-etch button 265 and the manual clamp control button 266. The manual pre-etch valve 265 is used to open up the valve for test purposes or to give a sheet of plastic material more of the pre-etch solution if the timer 263 did not function to furnish enough of the pre-etch solution. The clamping means 251 may be manually released by operating the stop unclamp button 264 when the need for such action arises.

The platform or workpiece support 250 is preferably made from any suitable metallic material. The numeral 267 in FIG. 13 indicates a spray shield which is mounted in the back portion of the machine frame.

Station 8 may be termed the color etch station. As shown in FIGS. 2, 3, 6 and 14, this station includes a transfer table 268. The transfer table 268 includes the steel plate 269 which is substantially rectangular in shape and approximately 25 inches long and 29 inches wide. The plate 269 is fixedly mounted on a rectangular frame as 270 which is provided with suitable legs along each side as 271 that carry the rollers 272. The rollers 272 are adapted to be rollably mounted in aluminum channels as 273 which are fixedly mounted along each side of the station. The channels 273 function as tracks for the rollers 272 to permit the transfer table to be moved inwardly or outwardly. Fixedly connected to the inner end of the transfer table 268 is the angle arm 275 which is connected to the piston rod 276 of the air cylinder generally indicated by the numeral 274. The arm 275 is held to the piston rod 276 by means of the lock nuts 277 and 278. As shown in FIGS. 14 and 19, air under pressure is supplied to the cylinder 274 by means of the conduits 281 and 282 which are selectively supplied with air under pressure from the air reservoir 219 by means of the conduits 220, 221, 279 and the four-way reversing solenoid valve 280. The valve 280 may be of any suitable type and alternately supplies air to either end of the cylinder 274 in a conventional manner.

The air cylinder 274 is identical to the air cylinder 269 as used in Station 6. The piece of plastic material which is to be color etched at this station is laid on the plate 269 and held in place by means of the mask 383 which is substantially rectangularly shaped and of the same approximate size as the table 269. As shown in FIG. 14, the mask 383 is provided with a central opening therethrough as 384 which is made approximately one-quarter inch smaller in cross-section than the piece of plastic material to be processed at this station. The plastic material is held securely to the plate 269 by the mask 383 which is in turn held in place by means of suitable bolts and wing nuts generally indicated by the numeral 385. FIG. 14 does not show any plastic material disposed between the mask 383 and the plate 269 but FIG. 3 shows a piece of plastic material 89 mounted in place on the plate 269.

After the sheet of plastic material 89 has been disposed on the transfer plate 269 and it is secured in place by means of the mask 383, the operator presses the automatic start button 283 which initiates the movement of the transfer table 268 inwardly at a metered speed under the two automatic Binks spray guns generally indicated by the numerals 284 and 285. The spray guns 284 and 285 are disposed in a side-by-side position above the travel path of the transfer table 268 in the back portion of the machine structure at Station 8, as shown in FIGS. 14 and 19. The spray guns spray color etching fluid onto the plastic sheet material at a velocity of approximately 30 lbs. p.s.i. When the transfer table 268 has passed under the spray guns 284 and 285, it will trip the limit switch 286 which will function to de-energize the four-way reversing valve 280 and reverse the pressure fluid to the cylinder 274 whereby the transfer table 268 will be moved outwardly to the position shown in FIG. 14. The transfer table 268 will also trip the limit switch 287 during the inward movement of the transfer table 268, and this switch 287 functions to energize the guns 284 and 285 so that they will spray down on the transfer table when the plastic sheet starts under the guns.

The color etch formulations used at this station to etch the desired design into the plastic and to color the same simultaneously vary with the plastic being used or worked on. All of the etch formulations used are basically of the mixture of toluene, methyl isobutyl ketone and aniline dyes. The proportions used are normally four parts of toluene, one part of methyl isobutyl ketone, and in making up a gallon of this formulation the amount of aniline dye used would be approximately 22 to 25 grams. An illustrative formulation for use in color etching vinyl plastic is as follows: 28 oz. methyl isobutyl ketone, 100 oz. toluene, ¼ oz. mineral oil and 25 grams oil soluble dye as aniline dye.

It will be understood that the aforedescribed formulation carries out two functions, namely, etching and coloring. The formulation etches out the outline of the desired design which has been exposed and pre-etched out of the albumen light sensitive coating on the plastic. The deep etch formulation fills the design which has been pre-etched out of the albumen coating and etches the plastic material and leaves a deposit of dye in the etched marks made in the plastic. When the deep etch formulation is to be used for etching and marking designs in a sheet of plastic material, as for example, a comparator chart, the material which is left in the etch marks is in the nature of a deposit material, as for example, the aforementioned aniline dye, and of a desired color. When the process of the present invention is used to etch a printed circuit in a sheet of plastic, the deposit material will be any suitable material having a metallic conductive base, and in this instance the aniline dye will not be used. In lieu thereof a metallic conductive base material is used. A suitable metallic conductive base material is available and known on the market as "Dag Copper Dispersion Solution," and this solution is made by the Acheson Colloids Company of Port Huron, Michigan.

The aforementioned Binks spray guns 284 and 285 are air operated and are available from the Binks Manufacturing Co. of Chicago, Illinois. The spray guns 284 and 285 are secured by means of suitable rods as 288 in an operative position over the travel path of the transfer table 268. As shown in FIG. 14, one end of the rods 288 would be attached to the respective spray guns and the other end would be attached to the upper portion of the machine frame. The spray guns 284 and 285 are pneumatically operated and controlled by the solenoid 289, as shown in the circuit diagram of FIG. 18, and as described in detail hereinafter.

The operation of the spray guns 284 and 285 will be described by reference to FIGS. 9, 14 and 19. The deep etch fluid is contained in a one quart container indicated by the numeral 290 in FIG. 9. The tank 290 is interchangeable and a number of formulations having different colors can be switched and used in the machine within a matter of a short time. The fluid supply tank 290 is provided with air under pressure for forcing fluid therefrom and to the spray guns by means of the conduit 220, the gauge 291, the conduit 292, the shut-off valve 293 and the conduit 294. The fluid is transmitted to the spray gun 284 by means of the conduit 295, gauge 296, and the conduit 297. The deep etch fluid is supplied to the gun 285 by means of the conduit 295, the gauge 296 and the conduit 297. The operating valves in the spray guns 284 and 285 are maintained in the closed position by means of air supplied through the conduits 299, 300 and 301, and the pressure regulating valve 302 and the shut-off valves 303 and 304. Air under pressure is supplied to the spray guns 284 and 285 for triggering the same and opening the valves therein to let the etch fluid pass out through the nozzles thereof in the following manner. Air under pressure flows through the conduits 220 and 221 and through the pressure regulating valve 222 and into the conduit 305 and to the solenoid control valve 289. Conduit 305 is provided with the shut-off valve 306. The trigger air is conveyed from the solenoid valve 289 by means of the conduits 307, 308 and 309 to the spray guns 284 and 285. The pressure of the air exerted on the fluid tank 290 varies from five to thirty pounds per square inch. The Binks spray guns 284 and 285 are standard spray guns and, accordingly, the details thereof need not be shown.

The automatic control system for Station 8 may be stopped in case of emergency by means of the push button stop switch 310. This station is also provided with a switch 311 for manual operation of the control system for moving the transfer table inwardly and outwardly for set-up purposes. This station is further provided with the manual control button 312 for manually controlling the operation of the spray guns for set-up purposes and test purposes.

Station 8 is provided with the fan 313 on the upper side of the rear machine structure. As shown in FIGS. 1, 6 and 9, the fan 313 is operatively supported by means of the structure 314 which is mounted on the shield 315. The shield 315 is fixedly mounted on the plate 317 which covers the upper end of the machine structure for the rear portion of Station 8. The fan 313 is driven by the motor 316 which is operatively connected in the electric control system for the machine so that the fan may be started and kept running whenever the entire machine is started. This fan structure 313 is a conventional fan, and a suitable fan for this purpose is one sold by the Binks Manufacturing Company of Chicago, Illinois, under Model No. 30–620.

Station 9 may be termed the viewing or inspection station and this station is basically a light table. As shown in FIGS. 1, 3 and 15, Station 9 is provided with a tank 318 which is constructed in the same manner as the tank 112 of Station 4. There are no water inlet or drain connections for the tank 318 since none are required. As shown in FIG. 15, this station includes a plurality of fluorescent tubes as 319 which are mounted on the bottom of the tank 318. The tank 318 is covered at the top end thereof with a one-quarter inch thick plate glass which is preferably frosted in any suitable manner as by sand blasting. The glass top is indicated by the numeral 320. This station is used for gauging and checking of the workpieces after they have been processed through Stations 1 through 8. As shown in FIGS. 1, 2 and 18, Station 9 is provided with a switch 321 which may be turned to either the "on" or "off" position. If this switch is left in the "on" position, the light 319 will automatically be turned on when the master start button is pressed to energize the entire control circuit of the machine.

FIG. 17 shows additional control buttons and signal lights on the control console 322. The numeral 323 indicates a switch for manually controlling the operation of the color etch motor 316. The master start switch for the entire control circuit is indicated by the numeral 175. The numeral 325 indicates the pilot light which is energized when the master switch 175 is operated, to indicate that the machine control circuit is energized. The numeral 326 indicates the master stop button which is operative to completely isolate all of the controls of the machine including the air compressor system. The master start switch 324 will initiate all controls in the complete machine.

Station 10 (FIG. 1) may be termed the final wash station where all the albumen coating is removed after the deep color etch formulation has dried in the etched outline on the plastic material. The drying period normally is about thirty seconds. This station is provided with a tank 327 (FIGS. 1, 20 and 21) which is constructed in the same manner as the tank 92 of Station 2. The tank of Station 10 is connected by means of the water inlet line 328 and the shut-off valve 329 to the water inlet supply line 104. The tank 327 is also provided with a suitable drain pipe 330 which connects the tank to the main drain line 99. The water is circulated constantly through the tank 327 at a rate of approximately two gallons per minute. The water pressure of the inlet water is approximately twenty pounds per square inch.

The albumen light sensitive coating which is used on the plastic workpiece will not be dissolved by the color etch formulation used at Station 8, but said coating is readily soluble in water. The plastic workpiece is completely immersed in the water in Station 10, and the albumen coating will be quickly and readily washed off of the workpiece. For example, a .001 of an inch coating of albumen can be washed off a plastic workpiece in approximately 30 seconds.

Station 11 is termed the final rinse station. As shown in FIG. 1, Station 11 is provided with a tank 331 which is provided with the same type drain and water supply fittings as the tank 92 in Station 2. As shown in FIG. 21, the tank of Station 11 is provided with a water inlet pipe 332 in which is connected a conventional shut-off valve 333. The inlet line 332 is connected to the main water inlet line 104. In FIG. 20, the tank 331 is shown as being provided with a drain pipe 334 which connects this tank to the main drain line 99. The tank 331 is constructed in the same manner as the tank 92 of Station 2. Station 11 contains a wetting agent, and any suitable wetting agent solution may be used. A suitable wetting agent solution is one readily available on the market and obtainable from any lithography supply store under the trade name of Kodak Photo-Flo, and it is made by the Kodak Company of Rochester, New York. The sheets of the plastic are dipped in the wetting agent solution for approximately thirty seconds and are then removed and put into the rack dryer of Station 12. The color etch formulation used in Station 8 is not soluble in the water which is used in Station 10, nor is it soluble in the wetting agent solution used in Station 11 and so it is retained in the etched crevices or grooves in the plastic material. The wetting agent solution of Station 11 functions to provide a more even drying action in the final drying step of Station 12.

Station 12 is termed the drying tank or drying station. This station includes the tank 335 which is constructed in the same manner as all of the other tanks used in the other stations of the machine, but tank 335 is approximately twice as deep as the other tanks used in the machine. As shown in FIG. 21, tank 335 is connected to the water inlet line 104 by means of the inlet pipe 336 and the shut-off valve 337. The tank 335 is also provided with the drain pipe 338 which connects this tank to the main drain line 99, as shown in FIG. 20. As shown in FIGS. 1 and 16, Station 12 is provided with a wooden rack generally indicated by the numeral 339. The rack 339 comprises the end boards 340 and 341 between which are mounted the transverse upper wooden rods 342 and the lower transverse wooden rods 343. The transverse rods 342 and 343 are connected by a plurality of laterally spaced apart vertical wooden rods 344. The rack 339 further includes the side boards 345 between which are fixedly mounted the longitudinally extended, laterally spaced apart wooden rods 346. As shown in FIG. 16, the rods 346 function as base rods upon which the pieces of plastic 89 are adapted to rest while they are going through the drying period at the Station 12. It will be understood that a plurality of vertically disposed pieces of plastic material 89 may be mounted in the drying Station 12 at any time.

Station 13 is a general work area station where the plastic workpieces may be sorted and cut and racked. As shown in FIG. 1, Station 13 is constructed similar to Station 1 and comprises a box-like supporting frame structure which is made from tubular material of the same type from which the main frame of the machine is made. Station 13 is provided with a plurality of storage shelves as 347 for storing plastic land chemicals. The stop surface 348 is used as a working area.

The electrical control circuit for the machine of the present invention is shown in FIGS. 17 and 18, and this circuit will now be described in detail. The electrical control panel which carries the various control elements of the circuit is mounted in a control panel box 349 as shown in FIG. 9. The various lines of the control circuit of FIGS. 17 and 18 have been marked with reference numerals, and these reference numerals have been placed in a square box on the left side of the circuit. The circuit has been broken into five main sections which correspond to the various operations carried out by the machine. The first section relates to the general starting of the machine, the second section relates to Stations 4 and 5 where the whirling action takes place, the third section relates to the controls for the exposure Station 6, the fourth section relates to the pre-etch controls for Station 7 and the fifth section relates to the color etch controls for Station 8.

Referring to FIG. 17 and to the upper end thereof, it will be seen that the incoming power terminals are labeled L1, L2, and L3. These terminals may be connected to any suitable source of electrical power which is adapted to supply power at the rate of 220 volts, 3 phase 60 cycle power. The current requirements for the machine is 45 amperes. Located below these power terminals are fuses which are labeled F1, F2, F3. These fuses are used to protect the primary voltage entering the control system. The power input lead lines L1 and L3 are connected to the primary coils 350 and 351 of the control circuit transformer generally indicated by the numeral 352. The power input lead lines L1, L2 and L3 are also connected to the three relay contacts labeled "M" which are interconnected in the reference lines 1, 2 and 3 leading to the compressor motor 216. The compressor motor 216 is preferably a one and one-half horse power motor. As shown in FIG. 17, the circuit reference lines 1 and 3 are provided with the thermo over-loads indicated by the numerals 353 and 354.

As shown in circuit reference line 4, the secondary coil of the control circuit transformer 352 is provided with the terminals labeled X1 and X2. The terminal X1 is the positive current contact for the control system, and the contact X2 is the negative current contact for the control system. Lead wire #1 is connected to the contact X1 at one end thereof and at the other end thereof to the fuse 355. The opposite side of the fuse 355 is connected to the lead wire #2 and the other end of this wire is connected to the master start button 175 and to one side of the relay contact labeled "M" in reference line 6 for the motor 216. On the other side of the master start button and the motor relay contact "M" is the lead wire #3, circuit reference lines 5 and 6, which is connected to the master stop button 326 and to the complete control circuit system as shown in circuit reference line 7. The lead wire #3 is the main feeder line. The lead #3 is directly connected, as shown in circuit reference line 7, to the solenoid coil of the electric solenoid valve 105 for controlling the water input going into the machine. The valve 105 is a master water flow control valve for the entire machine and when it is de-energized, no water will flow into the various tanks. It will be seen that when the master start button 175 is energized, the flow control valve 105 will be energized to open the same to permit water to flow into the machine.

When the master start button 175 is momentarily depressed, current will flow to the lead wire 5 which is on the right side of the normally closed master stop switch 326, as shown in FIG. 17. The current will flow through the solenoid coil marked with a capital "M" in circuit reference line 5 thereby energizing a relay which closes all of the contacts labeled M in the control circuit, and these contacts are found in circuit reference lines 1, 2, 3 and 6. The circuit through the capital M coil is completed to the lead wire 4 which is connected to the transformer secondary coil contact X2. The pilot light 325 which is also indicated by the letter W is connected between the lead lines 5 and 4 in a position parallel to the motor start coil M and this pilot light will also be energized when the master start button 175 is depressed to show that the entire electrical control system is energized. At this point, the complete control circuit for all of the machine controls will be provided with power or power may be connected to them if the appropriate hereinafter described control switches and buttons are operated. The portions of the control circuit zone in circuit reference lines 1 through 7 may be termed the first section of the electrical control system.

The second section of the electrical control system is contained within the circuit reference lines 8 through 35 and this section is directed to the controls for Stations 4 and 5 which are the Nos. 1 and 2 whirler stations. The No. 1 whirler for Station No. 4 is controlled by the control means shown in reference lines 8 through 21 and the control means for the No. 2 whirler of Station No. 5 is located in the reference lines 21A through 35. As shown in FIG. 17, the automatic starter switch 181 for Station No. 4 is located in circuit reference line 8. The limit switch 189 which is also indicated by the term LS1 is connected to the circuit lead wire 3 on one side and to the lead wire 6 on the other side. The lead wire 6 is connected to the normally closed stop button 185 which is connected on the other side thereof to the lead wire 7. The lead wire 7 is connected to the automatic start switch 181 and the other side of the switch is connected to the lead wire 4 by means of the lead wire 8. The lead wire 8 is interconnected with the pilot light 183 which is also indicated by the capital letter R. The pilot light 183 is energized when the automatic start button 181 is depressed to signal that the Station No. 4 control circuit is energized. The depressing of the automatic start switch 181 also energizes the solenoid coil 356 which operates the water-on clutch for the water-on timer 186. The energizing of the coil 356 also closes the timing contacts T1 in reference lines 9, 10, 12 and 13.

When the timing contact T1 in reference line 9 closes, it seals the circuit between lead wires 7 and 8, since it directs current around the automatic start button 181, and the start button 181 may be released. Current also flows down the lead wire 8 to the timing contact T1, in reference line 12, of the water timer T1 in reference line 10. The contact T1 in reference line 12 is normally closed and current will flow through this closed contact and through the lead wire 10 and the normally closed switch 357 and through the solenoid coil of the water-on valve switch 119 to the lead wire 4. The water-on valve is thus operated to admit water into the tank 112 of Station 4.

The lead wire 10 is connected to the timing contact T1 in reference line 10 and the current will flow through this timing contact to the lead wire 9 to start the timing motor T1 of the water-on timer 186. This timing motor T1 is normally set to zero. The manual water-on control button 190 is connected to the normally closed switch 357 by a mechanical interconnection so that when the switch 190 is depressed, the switch 357 will open to de-energize the automatic control over the water-on valve 119 and provide manual control thereover through the lead wire shown in reference line 11, which is connected to the lead wire 11 and by-passes the switch 357. The manual control over the water-on valve 119 continues as long as the manual water switch is depressed. At the end of the timing cycle of the timing motor T1, the contact T1 in line 12 will open and the contact T1 in reference line 13 which is normally open, will close, and connect the lead wires 8 and 12 so as to energize the surfacer-on timer solenoid clutch coil 358.

When the clutch solenoid coil 358 for the surfacer-on timer 187 is energized, the timing motor T2 for the surfacer-on timer as shown in reference line 14 will be energized simultaneously, and current will flow through the timing contact T2 in reference line 15 which is normally closed. This action connects the lead wires 12 and 13 so as to allow current to flow through the normally closed switch 359, the lead wire 14, the solenoid coil for the surfacer-on valve 162 and thence to the other side of the circuit to the lead wire 4. The surfacer-on valve 162 will thus be energized. As shown in FIG. 17, the manual surfacer switch 191 is mechanically connected with the switch 359 so that when the manual surfacer button 191 is depressed, it will open the switch 359 to break the automatic control over the surfacer-on valve 162 and provide manual control thereover by means of the lead wire shown in reference line 14 which passes around the switch 359 and is connected to the lead wire 14. The surfacer-on valve 162 will be energized as long as the button 191 is depressed so as to interrupt the automatic control cycle. All of the manually operated buttons in the control circuit are used for emergency use and set-up use only, and they are not a part of the actual automatic operation control circuit of the machine.

At the end of the timing cycle of the timing motor T2, as shown in reference line 14, the timer contact T2 in reference line 15 will open and the normally open timing contact T2 in reference line 16 will close so as to connect the lead wires 12 and 15. This last mentioned action will stop the surfacer-on valve 162 and energize the coil 360 of the clutch for the timer 188 for the rotating table 121. The timer motor T3 for the timer 188 also will be energized. Current is also passing through lead wire 8 and down through the normally closed timer motor contact T3 shown in reference line 18. The current passes through the contact T3 and thence into the lead wire 16 and through the normally closed switch 361 and into the lead wire 17 and through the whirler motor 148 and thence to the other side of the line to the lead wire 4 so as to energize the motor 148. At the end of the timing cycle of the timing motor T3, the timing contact T3 in reference line 18 will open thus breaking the circuit between lead wires 8 and 16 and simultaneously, the timing contact T3 in reference line 19 will close to complete a circuit between lead wires 8 and 18 and the whirler motor brake solenoid 362 in reference line 19A, so as to bring the whirler motor 148 to a stop.

As shown in FIG. 17, the switch 172 which controls the operation of the heater 164 and the blower motor 169 in reference line 21A is adapted to connect the lead wire 3 to the lead wire 19 when it is set in the "on" position. It is normally set in the "on" position so that when the master start switch 175, in reference line 5 is depressed, the current will automatically pass through the lead wires 3 and 19 and through the heater 164 which is shown in reference line 21. Current is simultaneously passed through the rheostat 171 and the blower motor 169 which are shown in circuit reference line 21A. The selector switch 172 which is shown in reference line 21 is labeled "Heater-Blower, off-on." The rheostat 171 is used to provide a variable speed to the blower motor 169 which is a 1/16 horsepower and which is adapted to provide a speed from 0 to 200 r.p.m. This description ends the description of the operation of the section No. 2 of the control circuit which controls the No. 1 whirler station, No. 4.

When the automatic cycle complete light 184 is on and the unit has stopped, the operator will open the cover 123 which will release the limit switch 189 located in the circuit reference line 8. When this limit switch 189 opens, the complete circuit to all the timers and valves in the section No. 2 part of the control circuit will reset automatically and be ready for the next operation of loading another piece of plastic into the station. The manual whirler button 192 normally opens the contact located in reference line 18 and indicated by the term T3 and to close a circuit between the lead wire 3 and the lead wire 17 to permit manual control over the whirler motor 148 when the switch 192 is depressed.

The control circuit for Station No. 5 which is the No. 2 whirler station is located in FIGS. 17 and 18 in reference lines 22 through 35. The controls of the No. 2 whirler are identical to the controls of the aforedescribed No. 1 whirler and therefore these controls have been marked with similar reference numerals followed by the small letter b. The control circuitry in reference lines 22 through 35 function in the same manner as the control circuitry as set forth hereinabove and as described for the reference lines 8 through 21. The lead wires 20 through 23 in the No. 2 whirler circuit carry out the same function as the lead wires 6 through 19 in the No. 1 whirler circuit. The timers T1, T2, T3 and their corresponding contacts are equivalent to the timers T4, T5, and T6 and their respective contacts in the No. 2 whirler control section of reference lines 22 through 35.

The third main section of electric control system of the present invention is shown in FIG. 18 and comprises the circuitry shown in reference lines 36 through 42. This circuit section covers the control system for Station No. 6 which is the exposure station. After the operator has mounted the coated plastic workpiece with the master mounted on top of it on the transfer table 193, the automatic push button 234 shown in circuit reference line 36 is then depressed. When the start button 234 is momentarily depressed, the lead wire 3 will be connected to the lead wire 34 so as to conduct current through the solenoid coil 363 of the clutch assembly exposure timer T7 shown in reference line 42. Simultaneously, current is passed through the instantaneously closed contact T7 which is located between reference lines 36 and 37 and which is normally closed, so as to complete a circuit between the lead wires 34 and 36. The automatic start button 234 is isolated when the contact T7 in reference line 38, which is an instantaneous contact, closes to connect the lead wires 35 and 36 which are in series with the stop button 234 between the lead wires 3 and 35. The automatic stop button 234 may then be released and power will continue to flow from the lead wire 3 through the circuit of reference line 38 and through the vacuum switch 233 which is also designated by the symbol VS1. When the vacuum switch 233 closes, the lead wires 36, 37 and 38 are connected through the normally closed switch 364 in reference line 38. The power then passes from the lead wire 38 and through the CR3 relay contact which is normally closed which is an interlocking contact for the color etch Station No. 8. Current then flows through the lead wire 39 and the transfer-in valve solenoid coil 230 for transferring the transfer table 193 inwardly under the exposure light. It will be seen that the manual transfer switch 238 as shown in reference line 37 is mechanically interconnected with the switch 364 in line 38 so that when the manual transfer switch 238 is depressed, the vacuum switch 233 will be by-passed and the transfer-in valve solenoid coil 230 will be energized through the jumper lead wire shown in reference line 37 to provide manual control over the inward and outward movement of the transfer table 193.

The energizing of the transfer-in valve solenoid 230 completes the circuit from the lead wire 39 to the lead wire 4 and the unit will transfer in. The vacuum motor 227 will be energized through the lead wires 36, 40 and 44. When the transfer table 193 moves completely inwardly, the limit switch 236 which is located in reference line 41 and also indicated by the term LS3 will close connecting the lead wire 41 with the lead wire 3. Current then flows through the timing contacts T7 in reference line 41 to connect the lead wires 41 and 42 to energize the control relay CR2 in reference line 41A which is located between reference lines 41 and 42. The parts counter solenoid 365 will also be energized and the exposure-on timer motor T7 will also be energized. The exposure-on timer T7 is located between the lead wires 42 and the lead wire 4 and starts the timing cycle at this point. The timer T7 is normally set for forty seconds and at the end of this period the instantaneous timing contact T7, located in reference line 38 between wires 35 and 36 will open to de-energize the complete circuit and the transfer-in valve will be de-energized allowing the transfer table to return to the load position. The vacuum motor 227 will also be stopped so that the transfer table 193 may be open and the exposed workpiece taken out and a new workpiece put in. The manual stop button 241 shown in reference line 38 may be operated in case of an emergency to stop the transfer-in operation. The manual vacuum switch 239 in reference line 39 is mechanically interconnected to the normally closed switch 366 in reference line 40. The manual vacuum switch 239 may be operated to open the connection between the lead wires 36 and 40 and connect the lead wire 3 to the lead wire 40 through the lead wire shown in reference line 39 to provide manual control over the vacuum pump. The manual exposure switch 240 in reference line 42 may be operated to connect the timer T7 with the lead wire 3 to operate this timer for emergency purposes and set-up purposes.

The fourth section of the control circuit is shown in reference lines 43 through 48 and this section controls the pre-etch Station No. 7. After the operator has placed the plastic workpiece in position in the Station No. 7, the automatic start button 262 in reference line 43 is depressed to connect the lead wires 3 and 43. When the start button 262 is momentarily depressed, the solenoid coil for the timer T8 in reference line 46 is energized, and current moves through the line 43 and to the lead wire 4. The last mentioned clutch coil is shown in reference line 43 and indicated by the numeral 367. At the same time, the instantaneous timing contact T8 in reference line 45 closes, sealing in the automatic start button 262 and then it may be released. The contact T8 in reference line 45 connects the lead wires 3, 44 and 43 and current will flow through the manual clamp switch 368 in reference line 45 which is normally closed, and through the control relay contact CR3, which is normally closed. The current passes through the reference line 45 and through the clamp-in solenoid valve 253 and to the lead wire 4. Also, at this time, the timing contact T8 in line 46, which is normally closed, and which is located between wires 43 and 47, will pass current therethrough and to the instantaneous timing contact T8 located between the wires 47 and 48 in reference line 46. The last mentioned contact T8 is an instantaneous timing contact which closes to start the pre-etch on timer motor T8. At the same time, the pre-etch valve 256 will be operated since the solenoid coil therefor will be energized through the lead wires 47 and 49 and the normally closed switch 369, as shown in reference line 48. At the end of the timing cycle, the timing contact T8 located between lead wires 47 and 48, in reference line 46 will open, stopping the solenoid operated valve 256, de-energizing the clamping valve 253, and de-energizing the timer clutch solenoid 367.

The manual clamp button 266 may be depressed to open the switch 368 in reference line 45 to provide manual control over the clamping valve solenoid 253 by way of the lead wire shown in reference line 44 which completes a circuit from lead wire 3 to the lead wire 45. The switch 264 in reference line 45 permits the opening of the circuit in reference line 45 to de-energize the clamping valve solenoid 253. The manual control button 265 in reference line 47 permits the operator to open the switch 369 in reference line 48 to de-energize the automatic control over the solenoid 256 and provide manual control through the lead wire shown in reference line 47.

The next station is Station No. 8 and the control circuit therefor is shown in FIG. 18 in reference lines 49 through 53. After the operator has mounted the plastic workpiece in position on the transfer table 268, the automatic start button 283 in reference line 49 is depressed. When the automatic start button 283 is momentarily depressed, current will flow from the lead wire 3 into the lead wire 50, through the normally closed stop switch 310, then through the lead wire 51 and the control relay CR3 and to the lead wire 4. The control relay CR3 is an interlocking relay to prevent the exposure Station No. 6 from operating while this color etch station is operating. Current also passes from the lead wire 51 through the manual transfer normally closed button switch 370 and to the lead wire 53 to actuate the transfer-in solenoid valve 280 which is located in reference line 50 in the circuit of FIG. 18. The control relay CR3 contact in line 50 also seals in the automatic start button 283 which may be released after it is momentarily depressed.

The control relay contact CR3 in reference line 50 connects the lead wires 3 and 52 so as to pass current through the normally closed limit switch 286 which is also designated by the term LS4. The limit switch 286 completes the circuit around the automatic start button 283 since it is conneced to the lead wire 50. The current passes through the lead wire 52 to the limit switch 287 in reference line 53 which is also indicated by the term LS5. The limit switch 287 is normally open but it is tripped or closed by the moving transfer table 268 to complete a circuit through the lead wire 54, the normally closed switch 371 and the lead wire 55, to the solenoid coil of the spray gun "on" control valve 289. The valve 289 will be energized to turn on the automatic spray guns 284 and 285. When the transfer table 268 gets to the end of its inward movement, it will engage the limit switch 286 shown in reference line 50 to open the same whereby the circuit at this station will be opened and the transfer table 268 will be returned to its loading position, and the spray guns 284 and 285 will stop operating.

The operation of the control system of Station No. 8 may be stopped for emergency purposes by depressing the stop switch 310 which is located in the circuit reference line 49. The transfer table 268 may be manually controlled by depressing the manual transfer switch 310 which is mechanically connected to the switch 370 whereby the automatic control system over the transfer-in valve 280 is broken and a manual control circuit is completed therewith through the lead wire shown in reference line 51. The spray guns 284 and 285 may be manually operated by depressing the switch 312 shown in reference line 52 which is mechanically connected with the normally closed switch 371. The opening of switch 371 brakes the automatic control circuit through the spray gun control solenoid coil valve 289 and completes the manual control circuit through the lead wire shown in reference line 52.

The "on," "off" control switch 321 for the color etch light 319 is shown in the reference line 54. As previously described, the light 319 is mounted in the inspection Station No. 9 and the switch 321 is a manual selector switch for completing the circuit from the lead wire 3 through the lead wire 56 and the light 319 and to the lead wire 4. Reference line 55 of FIG. 18 shows the selector switch 323 as being positioned between the lead wires 3 and 57 for energizing the one horsepower fan motor 316. It will be seen that the inspection light 319 and the fan motor 316 will be started when the master start switch 175 for the entire circuit is operated provided that the switches 321 and 323 are in the "on" position. Located in reference line 56 is a parts counter re-set push button 372 for connecting the lead wire 58 to the lead wire 3 to energize the re-set solenoid 373 for the parts counter.

Reference line 57 of the electrical control circuit is shown in FIG. 17 at the top end thereof and in this line is shown a special unit which is used at the exposure Station No. 6, and it is called the astrolux unit. This unit supplies the power to ignite the strobe part 210 which draws a power of 2,000 watts. The astrolux unit is operated by a single phase, 60 cycle, 220 volt power supply which provides a current of 20 amps. This unit is connected directly to any suitable power source near the machine, as for example, the power inlet lines L1 and L3. The astrolux unit is self contained and it has connections for the strobe tube and also a starting cycle contact CR2 which is operated from the control relay located between reference lines 41 and 42 and labeled CR2. The light tube 210 will produce a light which is white in nature and which has a lumen output of 130,000 lumens. It is an argon fired tube. The circled numbers on the wiring diagrams of FIGS. 17 and 18 near the contacts are commensurate with the contact numbers which appear on the various standard timers used in the circuit.

The machine of the present invention is adapted to carry out my process for making deep etched plastic articles which is disclosed in my co-pending U.S. patent application, Serial Number 574,724, which was filed on March 29, 1956, now abandoned. Experience has shown that the machine of the present invention is well adapted to accurately and quickly deep etch a plastic workpiece in a manner not achievable by the prior art etching machines. The machine of the present invention is capable of processing a large quantity of plastic workpieces with a minimum of operators and time expended per workpiece.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. In a semi-automatic etching machine for carrying out an etching process for color etching designs and written material in the surface of a sheet of plastic material, the combination, comprising: a frame; a plurality of work stations mounted on said frame; said work stations including, a station for loading, a station for cleaning the sheet of plastic material, a station for coating the sheet of plastic material with a wetting solution, at least one station for coating the sheet of plastic material with a light sensitive material, a station for mounting a master transparent design template on the coated sheet of plastic material and exposing the same to a light source, a station for developing out the unexposed coating covered by the master template, a station for applying a color etching formulation on the sheet of plastic material for etching and coloring the design of the master template in the sheet of plastic material, a station for viewing the etched sheet of plastic material, a station for washing off the light sensitive material, a station for rinsing the sheet of plastic material in a cleaning solution, and a station for drying the etched sheet of plastic material.

2. In a semi-automatic etching machine for carrying out an etching process for color etching designs and written material in the surface of a sheet of plastic material, the combination, comprising: a frame; a plurality of work stations mounted on said frame; said work stations including, a first station for loading and storing a plurality of said sheets, a second station for cleaning the sheet of plastic material, a third station for coating the sheet of plastic material with a wetting solution, a fourth and fifth station for coating the sheet of plastic material with a light sensitive material, a sixth station for mounting a master transparent design template on the coated sheet of plastic material and exposing the same to a light source, a seventh station for developing out the unexposed coating covered by the master template, an eighth station for applying a color etching formulation on the sheet of plastic material for etching and coloring the design of the master template in the sheet of plastic material, a ninth station for viewing the etched sheet of plastic material, a tenth station for washing off the light sensitive material, an eleventh station for rinsing the sheet of plastic material in a cleaning solution, a twelfth station for drying the etched sheet of plastic material, a thirteenth station for unloading the machine and storing a plurality of finished sheets of plastic material; a water supply system connected to a number of said work stations for selectively supplying water thereto; a drainage system connected to said number of work stations; and, an electrical control system for controlling the operations at some of said work stations.

3. The semi-automatic etching machine as defined in claim 2, wherein said second station for cleaning the sheet of plastic material comprises: a tank connected to said water supply system and said drainage system for holding a quantity of cleaning fluid.

4. The semi-automatic etching machine as defined in claim 2, wherein said third station for coating the sheet of plastic with a wetting solution comprises: a tank connected to said water supply system and said drainage system for holding a quantity of wetting solution in which the sheet of plastic material is dipped for a pre-determined amount of time.

5. The semi-automatic etching machine as defined in claim 2, wherein each one of said fourth and fifth stations for coating the sheet of plastic material with a light sensitive material comprises: a tank connected to said water supply system and said drainage system; a rotatable table operatively mounted in said tank; jig means for mounting the sheet of plastic material on said table; power means connected to said rotatable table for rotating the same; drying means operatively mounted over said tank; a source of light sensitive material; a spray valve connected to said last mentioned source for spraying a pre-determined amount of light sensitive material on the sheet of plastic material; and, said electrical control system being connected to said power means, drying means and spray valve for rotating said table a pre-determined amount of time while said valve is operating.

6. The semi-automatic etching machine as defined in claim 2, wherein said sixth station for exposing the coated sheet of plastic material to a light source comprises: a light means for exposing the coated sheet of plastic material; a movable table for supporting the coated sheet of plastic material with a master transparent design template thereover; power means for moving said table from a loading position to an exposure position under the light means for a pre-determined time and then back to said loading position; and, said electrical control system being connected to said power means and light means for controlling the same in a pre-determined cycle of operation.

7. The semi-automatic etching machine as defined in claim 2, wherein said seventh station for developing the unexposed coating covered by the master template comprises: a tank connected to said water supply system and said drainage system; a source of developing solution; a spray valve connected to said source of developing solution; and, said electrical system being connected to said spray valve for spraying a pre-determined amount of developing solution on the coated sheet of plastic material.

8. The semi-automatic etching machine as defined in claim 2, wherein said eighth station for applying a color etching formulation on the plastic sheet of material on the portion where the light sensitive material was developed out comprises: a movable table for supporting the coated sheet of plastic material; power means for moving said table from a loading position to a color etching position and back to said loading position; a source of color etching formulation; a spray gun means for spraying said color etching formulation on the coated sheet of plastic material; and, said electrical control system being connected to said power means and spray gun means for controlling the same in a pre-determined cycle of operation.

9. The semi-automatic etching machine as defined in claim 2, wherein said ninth station for viewing the etched sheet of plastic material comprises: a tank; a light means in said tank; and, a translucent member mounted over said tank for disposing the coated plastic sheet of material thereon for viewing the same.

10. The semi-automatic etching machine as defined in claim 2, wherein said tenth station for washing off the light sensitive material comprises: a tank connected to said water supply and said drainage system for holding a quantity of cleaning fluid; and, means for constantly changing said cleaning fluid.

11. The semi-automatic etching machine as defined in claim 2, wherein said eleventh station for rinsing the plastic material comprises: a tank connected to said water supply and said drainage system for holding a quantity of rinsing fluid in which the sheet of color etched plastic material is dipped for a pre-determined amount of time.

12. The semi-automatic etching machine as defined in claim 2, wherein said twelfth station for drying the color etched sheet of plastic material comprises: a tank connected to said water supply system and said drainage system; and, a rack mounted in said tank for holding a plurality of etched sheets of plastic material for a pre-determined drying period.

13. In a semi-automatic etching machine for carrying out an etching process for color etching designs and written material on the surface of a sheet of plastic material, the combination comprising: a frame; a plurality of work stations mounted on said frame; a water supply system connected to a number of said work stations for selectively supplying water thereto; a drainage system connected to said number of work stations; an electrical control system for controlling and timing the operations at some of said work stations; said work stations including: a first station for loading and storing a plurality of said sheets, a second station for cleaning each sheet of plastic material and comprising a tank for holding a quantity of cleaning fluid connected to said water supply system and to said drainage system, a third station for coating a sheet of plastic material with a wetting solution and comprising a tank for holding a quantity of wetting solution in which said sheet is dipped for a predetermined amount of time, said tank also being connected to said water supply system and said drainage system, a fourth station and fifth station for coating the sheet of plastic material with a light sensitive material and comprising a tank also connected to said water supply system and said drainage system, a rotatable table operatively mounted in said tank, a jig for mounting the sheet of plastic material on said table, power means for rotating said table, drying means operatively mounted over said tank, a supply of light sensitive material, a spray valve connected to said supply for spraying a predetermined amount of light sensitive material on the sheet of plastic material and means for timing the rotation of said table for a predetermined amount of time while said valve is operating and while said drying means is operating, a sixth station for exposing the coated sheet of plastic material to a light source and comprising said light source, a movable table for supporting the coated sheet of plastic material with a master transparent design template thereover, power means for moving said table from a loading position to an exposure position under the light means for a predetermined time and for returning said table to said loading position, said light means and power means being connected to the electrical control system for controlling and timing a predetermined cycle of operation, a seventh station for developing the unexposed coating covered by the master template comprising a tank connected to said water supply system and said drainage system, a supply of developing solution, a spray valve connected to said spray of developing solution, and control means connected to said electrical system for causing said spray valve to spray a predetermined amount of developing solution on the coated sheet of plastic material, an eighth station for applying a color etching solution on the sheet of plastic material on the areas where the light sensitive material was developed and comprising a movable table for supporting the coated sheet of plastic material, power means for moving said table from a loading position to a color etching position and for returning said table to said loading position, a supply of color etching solution, spray gun means for spraying said color etching solution on the sheet of plastic material, and control and timing means connecting said electrical control system to said power means and spray gun means for controlling the same in a predetermined cycle of operation, a ninth station for viewing the etched sheet of plastic material, and comprising a tank, an illumination source in said tank and a translucent member mounted over said tank for disposing the plastic sheet of material thereon for viewing the same, a tenth station for washing off the light sensitive material and comprising a tank connected to said water supply system and said drainage system for holding a quantity of cleaning fluid and means for continuously changing said cleaning fluid, an eleventh station for rinsing the sheet of plastic material and comprising a tank connected to said water supply system and said drainage system and holding a quantity of rinsing fluid in which the sheet of plastic material is dipped for a predetermined amount of time, a twelfth station for drying the color etched sheet of plastic material and comprising a tank connected to said water supply system and said drainage system, a rack mounted in said tank for holding a plurality of sheets of plastic material for a predetermined drying period, and a thirteenth station for unloading the machine and storing a plurality of finished sheets of plastic material.

References Cited in the file of this patent
UNITED STATES PATENTS

| | | |
|---|---|---|
| 1,276,226 | Jones | Aug. 20, 1918 |
| 2,177,982 | Hannon | Oct. 31, 1939 |
| 2,506,632 | Dart | May 9, 1950 |
| 2,553,014 | Singer | May 15, 1951 |
| 2,762,149 | Mears | Sept. 11, 1956 |
| 2,784,653 | Pierce et al. | Mar. 12, 1957 |
| 2,830,899 | Brown | Apr. 15, 1958 |
| 2,849,299 | Young | Aug. 26, 1958 |
| 2,977,228 | Gold et al. | Mar. 28, 1961 |
| 3,043,693 | Strauss | July 10, 1962 |
| 3,081,210 | Wolf et al. | Mar. 12, 1963 |
| 3,108,031 | Hasala et al. | Oct. 22, 1963 |
| 3,113,901 | Bock et al. | Dec. 10, 1963 |